United States Patent
Collins et al.

(10) Patent No.: US 11,916,613 B1
(45) Date of Patent: *Feb. 27, 2024

(54) ON DEMAND FREQUENCY TESTING

(71) Applicant: VeEX Inc., Fremont, CA (US)

(72) Inventors: Christopher C. Collins, Norcross, GA (US); Charles J. Kiss, Jr., Grayson, GA (US); Michael Collins, Snellville, GA (US); Thomas R. Morley, Peachtree Corners, GA (US)

(73) Assignee: VeEX Inc., Fremont, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 17/589,544

(22) Filed: Jan. 31, 2022

Related U.S. Application Data

(60) Provisional application No. 63/153,266, filed on Feb. 24, 2021.

(51) Int. Cl.
*H04B 3/46* (2015.01)
*H04L 5/00* (2006.01)

(52) U.S. Cl.
CPC ............ *H04B 3/46* (2013.01); *H04L 5/0007* (2013.01)

(58) Field of Classification Search
CPC ..... H04L 5/0048; H04L 5/0007; H04L 5/001; H04L 27/26134; H04L 27/2613; H04L 25/0226; H04B 3/46
See application file for complete search history.

(56) References Cited

U.S. PATENT DOCUMENTS

| | | | |
|---|---|---|---|
| 8,327,409 B2 | 12/2012 | Maxson et al. | |
| 9,838,679 B2 | 12/2017 | Harris et al. | |
| 10,063,454 B2 | 8/2018 | Gotwals et al. | |
| 10,158,423 B2* | 12/2018 | Zinevich | H04B 10/25751 |
| 10,715,213 B1* | 7/2020 | Stelle, IV | H04L 27/2653 |
| 11,101,596 B1* | 8/2021 | Lin | H01R 13/521 |
| 2009/0213738 A1 | 8/2009 | Volpe et al. | |
| 2013/0182753 A1 | 7/2013 | Delforce et al. | |
| 2014/0294052 A1 | 10/2014 | Currivan et al. | |
| 2015/0020128 A1* | 1/2015 | Maxson | H04N 17/00 725/107 |
| 2016/0036492 A1* | 2/2016 | Williams | G01S 5/02695 375/228 |
| 2017/0104522 A1 | 4/2017 | Zinevich | |
| 2017/0353750 A1* | 12/2017 | Gotwals | H04N 21/4424 |

(Continued)

*Primary Examiner* — Khanh C Tran
(74) *Attorney, Agent, or Firm* — Sheppard Mullin Richter & Hampton LLP

(57) ABSTRACT

The present technology provides solutions that enable accurate measuring of frequency response on a network (e.g., cable network, fiber optic network) through frequency sweep testing. In various embodiments, the present technology provides a remote transmitter test unit that can be physically deployed at various points in a network. The present technology provides for on demand sweep testing. A remote transmitter test unit or headend test unit can periodically transmit a query message and, based on a response to the query message, can initiate a sweep test. The present technology provides for automatic generation of a sweep profile for a sweep test. Based on an analysis of a frequency spectrum on a network, the sweep profile provides parameters for conducting a sweep test. The present technology provides for Orthogonal Frequency-Division Multiplexing (OFDM) table generation and OFDM sweep testing.

20 Claims, 26 Drawing Sheets

(56) References Cited

U.S. PATENT DOCUMENTS

| | | |
|---|---|---|
| 2018/0219621 A1 | 8/2018 | Zinevich |
| 2019/0174162 A1 | 6/2019 | Soltanpur et al. |
| 2020/0314470 A1 | 10/2020 | Gotwals et al. |
| 2022/0109612 A1 | 4/2022 | Bush et al. |

* cited by examiner

ON DEMAND FREQUENCY TESTING

CROSS-REFERENCE TO RELATED APPLICATIONS

This application claims priority to U.S. Provisional Patent Application No. 63/153,266, filed on Feb. 24, 2021 and entitled "METHOD AND SYSTEMS TO CREATE ON DEMAND PERFORMANCE FREQUENCY SWEEP TESTING ON A CABLE TV DISTRIBUTION SYSTEM," which is incorporated herein by reference in its entirety.

FIELD OF THE INVENTION

The present technology relates to cable networks. More particularly, the present technology relates to on demand frequency testing on cable networks.

BACKGROUND

Today, people rely on cable networks for a variety of services, including digital telephone, multimedia entertainment, and Internet connectivity. Increasing growth in these services has spurred continued expansion of cable networks and continued development of services offered through cable network technologies. For example, a cable service provider can offer services such as digital telephone, digital television, and Internet connectivity. In one example, the cable service provider can provide for one customer bundled digital television and Internet connectivity services via a broadband connection on a cable network. In another example, the cable service provider can provide another customer bundled digital telephone, digital television, and Internet connectivity services together via another broadband connection on the cable network.

SUMMARY

Various embodiments of the present technology can include a device comprising an integrated power source, radio frequency (RF) components, configured to transmit forward signals through a network and receive return signals through the network, and computing components, including a processor, configured to interface with a section of the network, receive a sweep request from a field test unit on the section of the network, and generate sweep tones on the section of the network in response to the sweep request.

In an embodiment, the device further comprises an RF board, wherein the RF components are located on the RF board, and a CPU board, wherein the computing components are located on the CPU board, and wherein the RF board and the CPU board are stacked within a chassis.

In an embodiment, the RF components are located on a side of the RF board opposite with respect to a side of the CPU board where the computing components are located.

In an embodiment, the RF components are located on a side of the RF board facing the chassis, and wherein the computing components are located on a side of the CPU board facing the chassis.

In an embodiment, the device further comprises thermal material contacting the chassis and contacting heat generating components of the RF components and the computing components.

In an embodiment, the device further comprises a first RF-connector, wherein the RF components are configured to transmit the forward signals through the first F-connector, and a second F-connector, wherein the RF components are configured to receive the reverse signals through the second RF-connector.

In an embodiment, the device further comprises one or more RF-connectors, and one or more waterproof slide-on boots configured to cover the one or more RF-connectors.

In an embodiment, the device further comprises a user interface panel, wherein the user interface panel includes one or more USB interfaces, one or more Rj-45 connectors, and one or more LEDs to indicate at least one of: power, active forward signal, active return signal, battery charging, and battery status.

In an embodiment, the device further comprises a user interface panel and a weatherproof door that can cover the user interface panel.

In an embodiment, the device further comprises a metal chassis, wherein the integrated power source, the RF components, and the computing components are enclosed in the metal chassis, and a removeable protector with one or more attachment points.

In an embodiment, the integrated power source includes a rechargeable 3P3S battery.

In an embodiment, the computing components are further configured to generate a sweep profile for conducting a sweep test on the section of the network, wherein the sweep tones are generated based on the sweep profile.

In an embodiment, the computing components are further configured to facilitate an Orthogonal Frequency-Division Multiplexing (OFDM) sweep test on the section of the network.

In an embodiment, the computing components are further configured to measure reverse sweep tones on the section of the network.

Various embodiments of the present technology can include systems, methods, and non-transitory computer readable media configured to receive a sweep request in response to a periodic query transmission, provide a sweep profile for measuring sweep tones on a network, generate a first timing synchronization message, and generate first sweep tones subsequent to provision of the timing synchronization message.

In an embodiment, the systems, methods, and non-transitory computer readable media are further configured to generate a second timing synchronization message in response to a request for a subsequent sweep test, and generate second sweep tones subsequent to provision of the second timing synchronization message.

In an embodiment, the systems, methods, and non-transitory computer readable media are further configured to provide a query for a subsequent sweep test, and provide periodic queries for sweep tests based on a lack of reply to the query for the subsequent sweep test.

In an embodiment, the systems, methods, and non-transitory computer readable media are further configured to provide the periodic query transmission through a forward communication channel, and provide information related to a frequency associated with a reverse communication channel.

In an embodiment, the systems, methods, and non-transitory computer readable media are further configured to receive reverse sweep tones on the network, measure the reverse sweep tones, and provide an indication of a frequency response of the network based on the measured reverse sweep tones.

In an embodiment, the sweep profile includes information associated with Orthogonal Frequency-Division Multiplexing (OFDM) sweep testing.

In an embodiment, the sweep profile is automatically generated and received from a field test unit.

In an embodiment, the sweep profile includes a channel table describing active channels in the network.

In an embodiment, the sweep profile includes start frequencies and stop frequencies associated with active channels in the network.

In an embodiment, the sweep profile is associated with a checksum.

Various embodiments of the present technology can include systems, methods, and non-transitory computer readable media configured to determine spectrum data based on a scan of frequencies on a network, generate a channel table including channel frequencies and channel types associated with the network based on the spectrum data, generate a sweep profile associated with the network based on the channel table, and perform a sweep test based on the sweep profile.

In an embodiment, the sweep profile includes start frequencies and stop frequencies associated with channels in the network.

In an embodiment, the sweep profile includes a forward communication frequency in a section of empty spectrum for communication.

In an embodiment, the sweep profile includes a sweep test transmission level.

In an embodiment, the systems, methods, and non-transitory computer readable media are further configured to generate a guardband table based on the channel table, wherein the guardband table identifies frequency ranges to be skipped in the sweep test.

In an embodiment, the guardband table includes flags that indicate whether a frequency is to be skipped, measured by peak power, or measured by average power.

In an embodiment, the guardband table identifies frequency ranges based on a frequency, an upper threshold value associated with the frequency, and a lower threshold value associated with the frequency.

In an embodiment, the channel types include analog signals, digital signals, and Orthogonal Frequency-Division Multiplexing (OFDM) signals In an embodiment, the sweep profile identifies OFDM subcarrier pilot frequencies to be measured in the sweep test.

In an embodiment, the sweep profile is transferred to a headend test unit or a remote transmitter test unit through a communication channel in the network.

Various embodiments of the present technology can include systems, methods, and non-transitory computer readable media configured to determine Orthogonal Frequency-Division Multiplexing (OFDM) pilot frequencies for an OFDM channel, determine guardband frequencies based on the OFDM pilot frequencies, generate a sweep profile based on the guardband frequencies, and perform a sweep test based on the sweep profile.

In an embodiment, the OFDM pilot frequencies are determined based on OFDM channel information obtained from a physical link channel (PLC) associated with the OFDM channel.

In an embodiment, the OFDM channel information is included in an OFDM Channel Description (OCD) message delivered through the PLC associated with the OFDM channel.

In an embodiment, the OFDM channel information includes at least one of: an OFDM channel ID, subchannel spacing, and subchannel assignments for the OFDM channel.

In an embodiment, the systems, methods, and non-transitory computer readable media are further configured to generate a guardband table based on the guardband frequencies, wherein the guardband table identifies frequency ranges to be associated with the OFDM pilot frequencies.

In an embodiment, the guardband table includes flags associated with the guardband frequencies that indicate the guardband frequencies are to be measured.

In an embodiment, sweep tones associated with the sweep test are prevented from being transmitted at the OFDM pilot frequencies.

In an embodiment, the sweep test includes measuring average power of the OFDM pilot frequencies.

In an embodiment, the sweep profile is automatically generated by a field test unit.

In an embodiment, the sweep test is performed based on an on demand sweep test request.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

Figure 1:
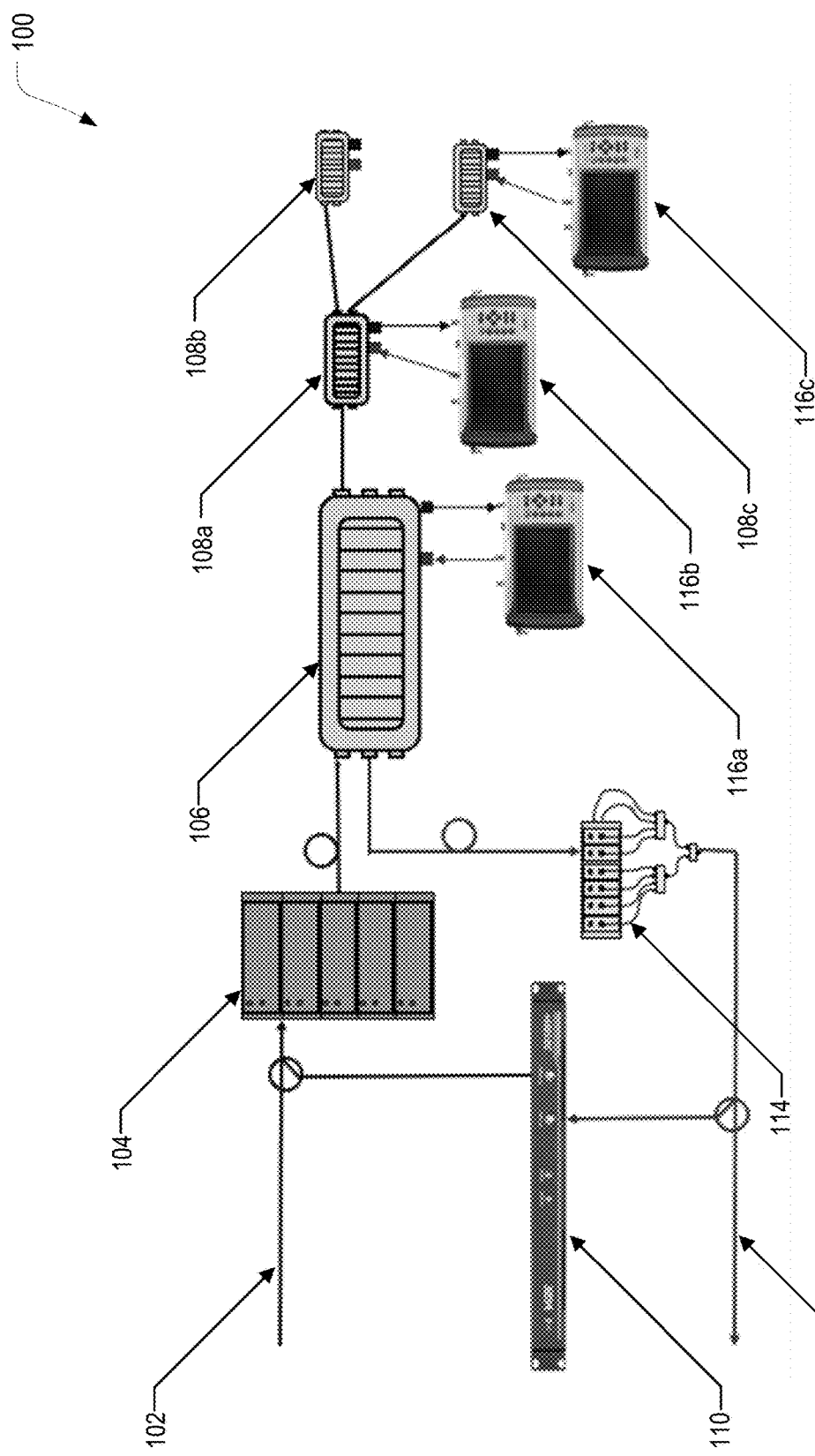
FIG. 1 illustrates an example network, according to conventional techniques.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Today, people rely on cable networks for a variety of services, including digital telephone, multimedia entertainment, and Internet connectivity. Increasing growth in these services has spurred continued expansion of cable networks and continued development of services offered through cable network technologies. For example, a cable service provider can offer services such as digital telephone, digital television, and Internet connectivity. In one example, the cable service provider can provide one customer bundled digital television and Internet connectivity services via a broadband connection on a cable network. In another example, the cable service provider can provide another customer bundled digital telephone, digital television, and Internet connectivity services together via another broadband connection on the cable network.

Through the use of various devices, such as signal amplifiers, cable networks are able to carry electronic signals across vast distances, allowing cable service providers to provide services to their customers. However, several factors can impact the provision of services via cable networks. For example, electronic signals transmitted through cable networks generally degrade over vast distances. Other environmental factors, such as inclement weather and exposure to water can also damage cables in the cable network, resulting in signal loss. Signal loss can disrupt the provision of services via cable networks. For example, signal loss can cause tiling in digital television services or cause services to be unavailable altogether. Accordingly, testing, maintenance, and repair of cable networks are vital to optimal delivery of services via the cable networks.

Under conventional approaches, a cable service provider may broadcast tones of varying frequency from a cable system source to a cable network. These tones are evaluated to test the frequency response of the cable network. However, testing the cable network under these conventional approaches faces several challenges. For example, locating faults in a cable network can be difficult because a fault can be located anywhere between the cable system source and a location where the tones are being evaluated. Further, broadcasting additional tones to a cable network increases the overall power transmitted through the cable network, which can overload the cable network, causing additional disruptions in service. These challenges become exacerbated as cable networks continue to expand and additional cable networks are deployed. Further, the use of cable networks to deliver more services, such as more digital television channels, and greater Internet access speeds, also exacerbates these challenges.

FIG. 1 illustrates an example network 100, according to conventional techniques. The example network 100 can be a hybrid network that incorporates cable network technology and fiber optic network technology. In the example network 100, a headend test unit 110 is coupled to a downstream connection 102 from a headend (not shown) and an upstream connection 112 to the headend. The downstream connection 102 from the headend is coupled to a transmitter 104 (e.g., forward path fiber laser in a fiber optic network). The transmitter 104 broadcasts signals generated by the headend and the headend test unit 110 to the example network 100. In the example network 100, a node 106 (e.g., fiber node in a fiber optic network) serves as a connection point for downstream traffic and upstream traffic in the example network 100. Further downstream from the node 106, the example network 100 includes amplifiers 108a, 108b, 108c. The amplifiers 108a, 108b, 108c amplify signal strength of the downstream traffic and the upstream traffic in the example network 100, extending the range the downstream traffic and the upstream traffic can travel. In the example network 100, upstream traffic travels to the headend through a receiver 114 (e.g., return path fiber receiver in a fiber optic network). As illustrated in FIG. 1, field test units 116a, 116b, 116c can be situated at various locations in the example network 100. Because the headend test unit 110 is situated close to the headend, a sweep test facilitated by the headend test unit 110 can be broadcasted through the example network 100. The sweep test can pose challenges with respect to locating faults in the example network 100. For example, the field test unit 116c can determine a fault in the example network 100 based on a sweep test facilitated by the headend test unit 110. The fault can be located anywhere between the headend test unit 110 and the field test unit 116c, including, for example, at the amplifier 108c, at the amplifier 108a, at the node 106, at the transmitter 104, and along any connection in between. Accordingly, conventional approaches fail to address these and other challenges arising in network technology.

An improved approach rooted in network technology and computer technology overcomes the foregoing and other challenges arising in network technology under conventional approaches. The present technology provides solutions that enable accurate measuring of frequency response on a network (e.g., cable network, fiber optic network, hybrid network) through frequency sweep testing. In various embodiments, the present technology provides a remote transmitter test unit that can be physically deployed at various points in a network. The remote transmitter test unit can support generating sweep test signals at the various points. In various embodiments, the present technology provides for on demand sweep testing. A remote transmitter test unit or headend test unit can periodically transmit a query message and, based on a response to the query message, can initiate a sweep test. In various embodiments, the present technology provides for automatic generation of a sweep profile for a sweep test. Based on an analysis of a frequency spectrum on a network, the sweep profile provides parameters for conducting a sweep test. In various embodiments, the present technology provides for Orthogonal Frequency-Division Multiplexing (OFDM) table generation and OFDM sweep testing. An OFDM table for an OFDM channel can be generated based on unmodulated pilot sub-channels or OFDM pilots. An OFDM sweep test can be performed on OFDM channels based on properly placed sweep measurement points within the OFDM channel. Thus, the present technology provides for technological solutions to technological challenges by providing, for example, a remote transmitter test unit for sweep testing, on demand sweep testing, automatic sweep profile generation, and Orthogonal Frequency-Division Multiplexing (OFDM) table generation and OFDM sweep testing. More details relating to the present technology are provided below.

Sweep Remote Transmitter Test Unit

A traditional headend test unit typically requires an external power source. Further, the traditional headend test unit typically requires a dry, climate-controlled environment. Because of these constraints, the traditional headend test unit is physically located in a main distribution center (e.g., headend) of a cable network. Thus, test signals generated by the traditional headend test unit are present throughout the entire cable network. These test signals make locating faults in the cable network difficult because the test signals are present throughout the entire cable network. Further, these test signals increase the overall power transmitted through the cable network, potentially causing further disruptions in service.

The present technology provides improvements over the aforementioned and other disadvantages associated with traditional headend test units. In various embodiments, the present technology provides a remote transmitter test unit that can include various improvements over a traditional headend test unit. For example, the remote transmitter test unit can include an integrated power source (e.g., battery). The integrated power source allows the remote transmitter test unit to be portable. The remote transmitter test unit can include a weatherproof enclosure. The remote transmitter test unit can include passive heat dissipation features. The weatherproof enclosure and the passive heat dissipation features allow the remote transmitter test unit to be deployed outdoors in various environments. The various improvements included in the remote transmitter test unit allows the remote transmitter test unit to be physically deployed at various points in a network. As the remote transmitter test unit can be physically deployed at various points in the network, the remote transmitter test unit can facilitate a sweep test at an intermediate point between a main distribution center of the network and an end point in the network. For example, the remote transmitter test unit can facilitate a sweep test at a system test point, a system test node, or a remote physical point in the network. From an intermediate point, the remote transmitter test unit can facilitate a sweep test for a section, or subsection, of the network. Thus, the present technology provides for technological solutions to technological challenges by providing a remote transmitter test unit that includes improvements over a traditional headend test unit. More details relating to the remote transmitter test unit are provided herein.

FIGS. 2A-2D illustrate example views of an example remote transmitter test unit, according to various embodiments of the present technology. The components (e.g., modules, elements, interfaces, blocks, functions, switches, etc.) of the remote transmitter test unit shown in these figures and all figures herein are exemplary only, and other implementations may include additional, fewer, integrated, or different components. Some components may not be shown so as not to obscure relevant details. Some components may be simplified so as to allow focus on relevant details. The remote transmitter test unit illustrated in these figures, and the remote transmitter test units described in other figures herein, can constitute test equipment that are special purpose computers. In some embodiments, the components of the remote transmitter test unit are integrated into a single (or one) device or apparatus. In other embodiments, the components of the remote transmitter test unit can be distributed over two or more devices or apparatuses. The components shown in these figures and all figures herein are exemplary only, and other implementations can include additional, fewer, integrated, or different components.

Figure 2A:
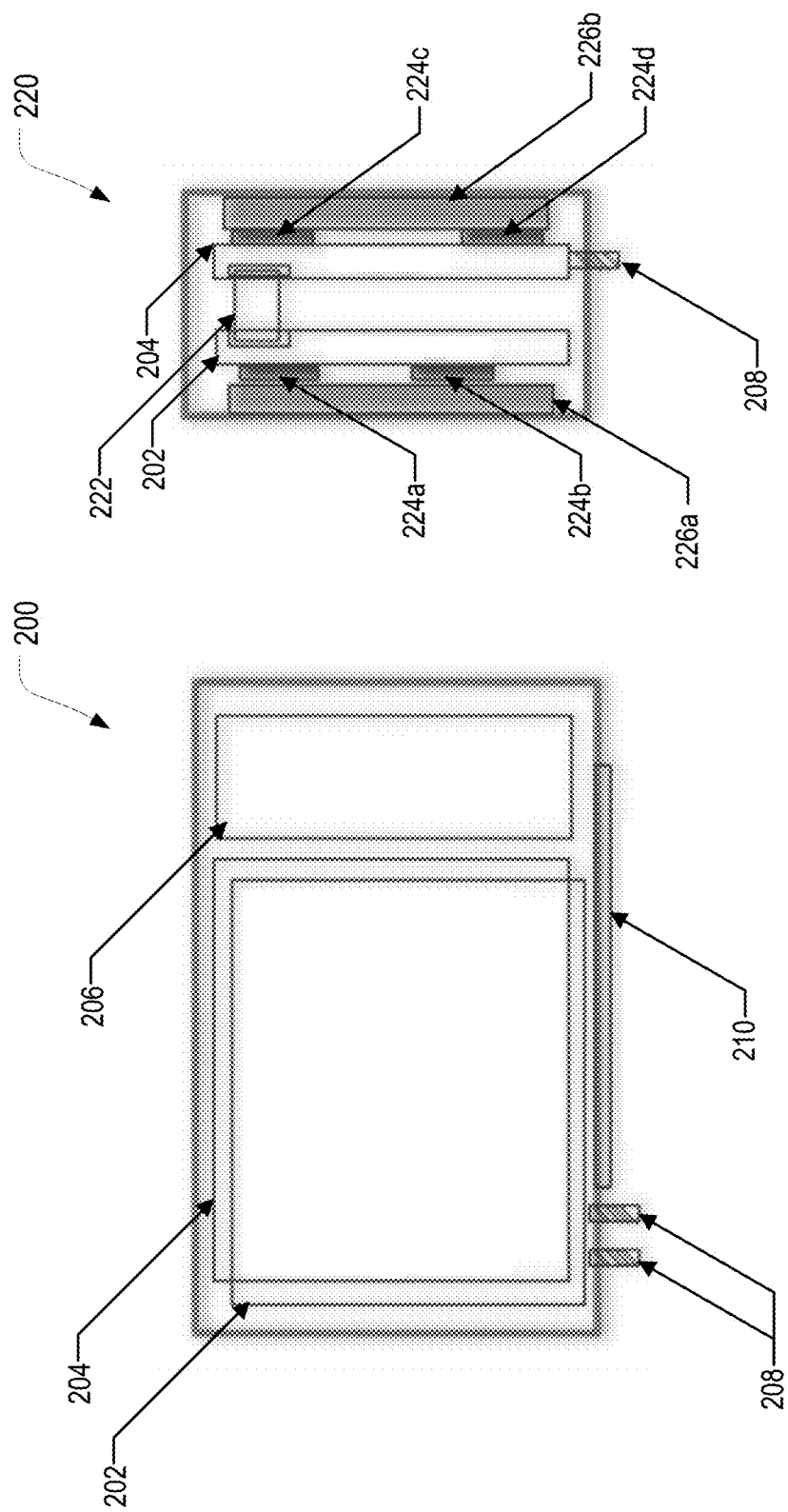
FIGS. 2A-2D illustrate example views of a remote transmitter test unit, according to various embodiments of the present technology.

FIG. 2A illustrates an example front view 200 and an example side view 220 of components of a remote transmitter test unit, according to various embodiments of the present technology. In various embodiments, the remote transmitter test unit can generate sweep tones for a sweep test. As illustrated by the example front view 200, the remote transmitter test unit can include a CPU board 202 within a chassis (e.g., structure, frame, body) of the remote transmitter test unit. The CPU board 202 can include various computing components (e.g., processor, memory, data store) for controlling various processes and functions of the remote transmitter test unit. Within the chassis, the remote transmitter test unit can include an RF board 204. The RF board 204 can include various RF components for measuring and evaluating frequency. The CPU board 202 and the RF board 204 can be stacked using one or more connectors to connect the CPU board 202 and the RF board 204. Stacking the CPU board 202 and the RF board 204 can improve portability of the remote transmitter test unit and make efficient use of space within the chassis. Within the chassis, the remote transmitter test unit can include a battery 206. In an example embodiment, the battery 206 can be a rechargeable 3P3S battery. As illustrated by the example front view 200, the remote transmitter test unit can include RF connections 208 on the chassis of the remote transmitter test unit. In an example embodiment, the RF connections 208 can include two F-connectors, or other types of RF-connectors, one for forward signals and one for return signals. The two F-connectors can include field replaceable barrels. Waterproof slide-on boots can be used to cover the RF connections 208 to maintain weatherproofing for the remote transmitter test unit. On the chassis, the remote transmitter test unit can include a user interface panel 210. In an example embodiment, the user interface panel 210 can include user buttons for power and other functions. The user interface panel 210 can include one or more USB interfaces for communication with various USB devices (e.g., USB data store, Bluetooth dongle, Wi-Fi dongle). The user interface panel 210 can include one or more RJ-45 connectors for communication through an Ethernet connection. The user interface panel 210 can include LEDs to indicate, for example, power, active forward signal, active return signal, battery charging, and battery status. A weatherproof door and/or a sealed membrane can cover the user interface panel 210 to maintain weatherproofing for the remote transmitter test unit.

The example side view 220 of the remote transmitter test unit shows the CPU board 202 and the RF board 204 stacked within the chassis of the remote transmitter test unit. The CPU board 202 can be stacked with the RF board 204 using one or more connectors, such as a connector 222. In an example embodiment, the connector 222 is a 40-pin connector connecting the CPU board 202 and the RF board 204. The CPU board 202 can include various computing components (e.g., processor, memory, data store). The various computing components can generate heat. The RF board 204 can include various RF components for measuring and evaluating frequency that also generate heat. As illustrated in the side view 220, heat generating components 224a, 224b of the CPU board 202 can be located on a side of the CPU board 202 that is opposite from (or not facing) the RF board 204. Heat generating components 224c, 224d of the RF board 204 can be located on a side of the RF board 204 that is opposite from (or not facing) the CPU board 202. The heat generating components 224a, 224b of the CPU board 202 and the heat generating components 224c, 224d of the RF board 204 can be located on sides of the CPU board 202 and the RF board 204 opposite from (or not facing) the connector 222. The heat generating components 224a, 224b of the CPU board 202 can be located on a side of the CPU board 202 facing outward toward the chassis of the remote transmitter test unit. The heat generating components 224c, 224d of the RF board 204 can be located on a side of the RF board 204 facing outward toward the chassis of the remote transmitter test unit. As illustrated in the side view 220, the remote transmitter test unit can include thermal materials 226a, 226b. The thermal materials 226a, 226b can contact the heat generating components 224a, 224b, 224c, 224d and the chassis of the remote transmitter test unit. The thermal materials 226a, 226b can facilitate heat transfer from the heat generating components 224a, 224b, 224c, 224d through the thermal materials 226a, 226b to the chassis of the remote transmitter test unit where the heat can be dissipated outside the remote transmitter test unit. In an example embodiment, the chassis of the remote transmitter test unit is a metal chassis that further facilitates heat dissipation. With the locations of the heat generating components 224a, 224b, 224c, 224d and the use of the thermal materials 226a, 226b, concerns with heat generation in a compact device like the remote transmitter test unit can be alleviated. Thus, as illustrated in FIG. 2A, the remote transmitter test unit can include various portability, weatherproofing, and heat dissipation features that allow the remote transmitter test unit to be physically deployed at various points in a network.

Figure 2B:
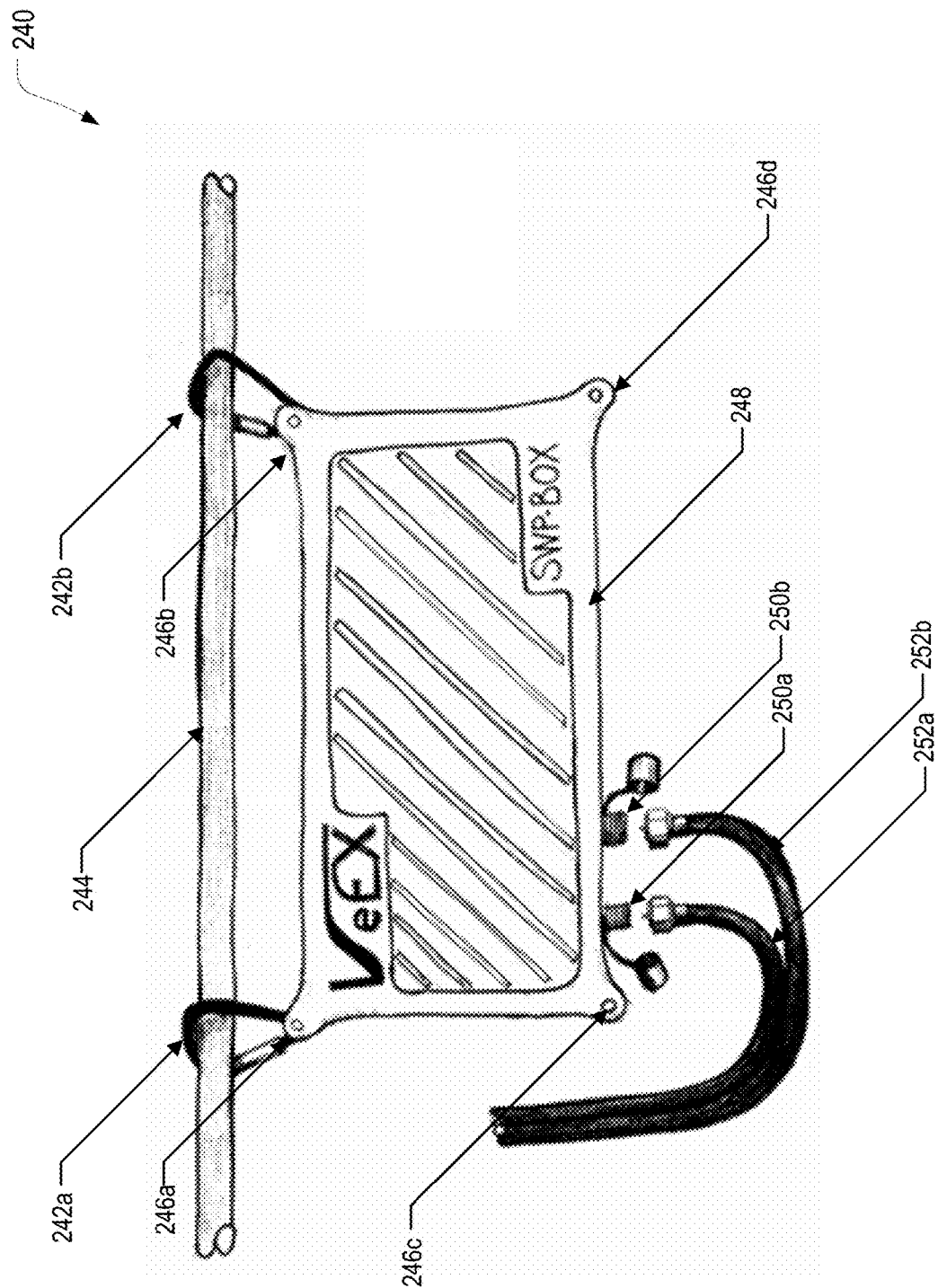

FIG. 2B illustrates an example view 240 of a removeable protector 248 of a remote transmitter test unit, according to various embodiments of the present technology. The example view 240 depicts the use of the remote transmitter test unit in an outdoor environment. As illustrated in the example view 240, the remote transmitter test unit can be enclosed in the removeable protector 248. In an example embodiment, the removeable protector 248 can be made of a hard plastic or rubberized material for absorbing bumps and shocks that may arise from being in an outdoor environment. The removeable protector 248 can include attachment points 246a, 246b, 246c, 246d from which various accessories can be attached. In the example scenario 240, carabiners 242a, 242b are attached at attachment points 246a, 246b on the removeable protector 248. The carabiners 242a, 242b and the attachment points 246a, 246b allow the remote transmitter test unit to hang from a support rod 244. The removeable protector 248 can include openings through which connectors of the remote transmitter test unit can be accessed. As illustrated in the example view 240, the remote transmitter test unit can interface with a network through coaxial cables 252a, 252b which are connected to the remote transmitter test unit via F-connectors 250a, 250b of the remote transmitter test unit that extend through openings of the removeable protector 248.

Figure 2C:
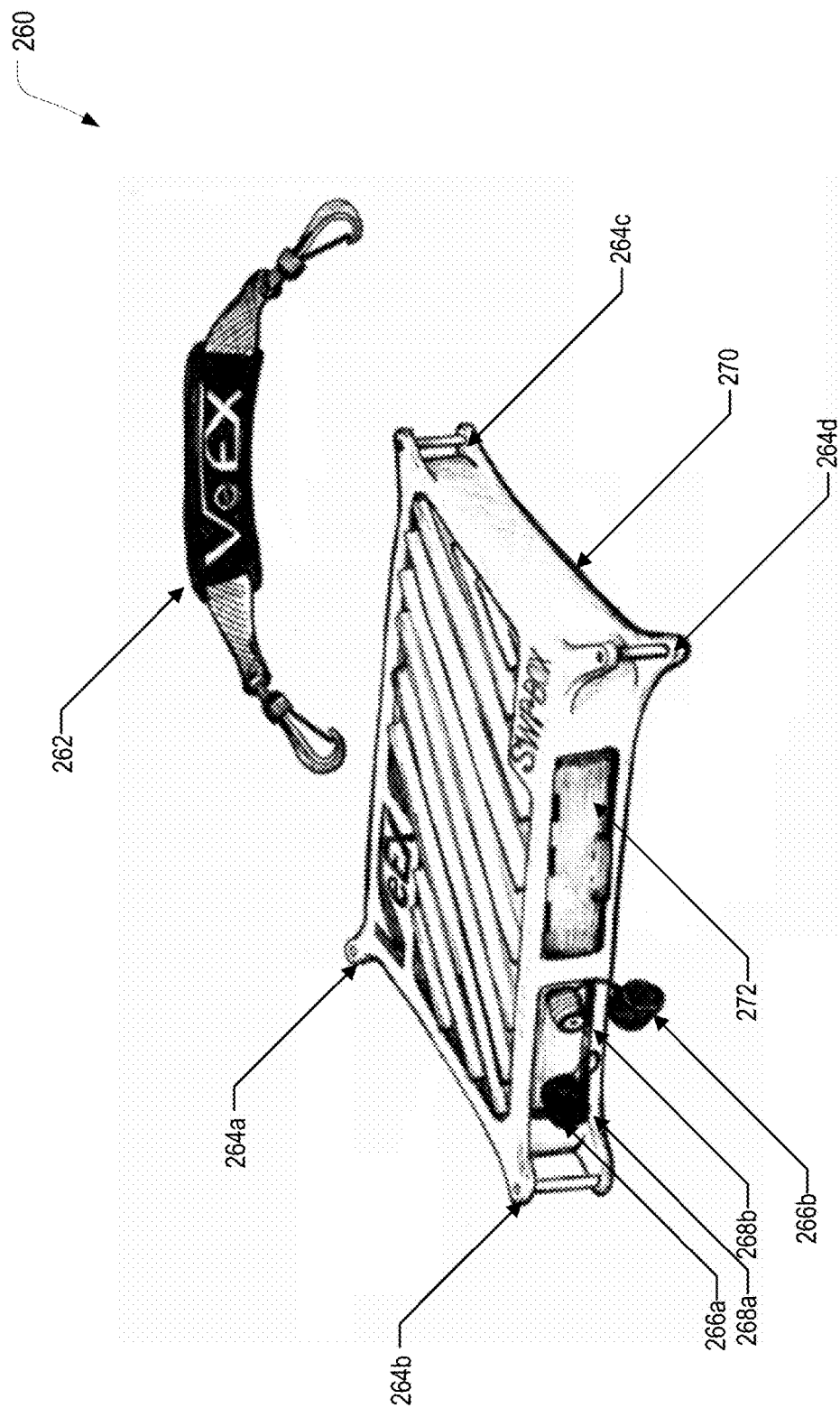

FIG. 2C illustrates an example view 260 of a removeable protector 270 of a remote transmitter test unit, according to various embodiments of the present technology. As illustrated in the example view 260, the remote transmitter test unit can be enclosed in the removeable protector 270. The removeable protector 270 can include attachment points 264a, 264b, 264c, 264d from which various accessories can be attached. In an example embodiment, a carry strap 262 can be attached to the attachment points 264a, 264b, 264c, 264d. The carry strap 262 can allow for easy transport of the remote transmitter test unit. As illustrated in the example view 260, the remote transmitter test unit can include two F-connectors 268a, 268b. Each F-connector 268a, 268b can be covered with a waterproof slide-on boot 266a, 266b. The waterproof slide-on boot 266a allows the remote transmitter test unit to maintain weatherproofing while an F-connector 268a is not in use. As illustrated in the example view 260, the removeable protector 270 (or the remote transmitter test unit) can include a weatherproof door 272 that covers a user interface of the remote transmitter test unit. The weatherproof door 272 allows the remote transmitter test unit to maintain weatherproofing while the user interface of the remote transmitter test unit is not in use.

Figure 2D:
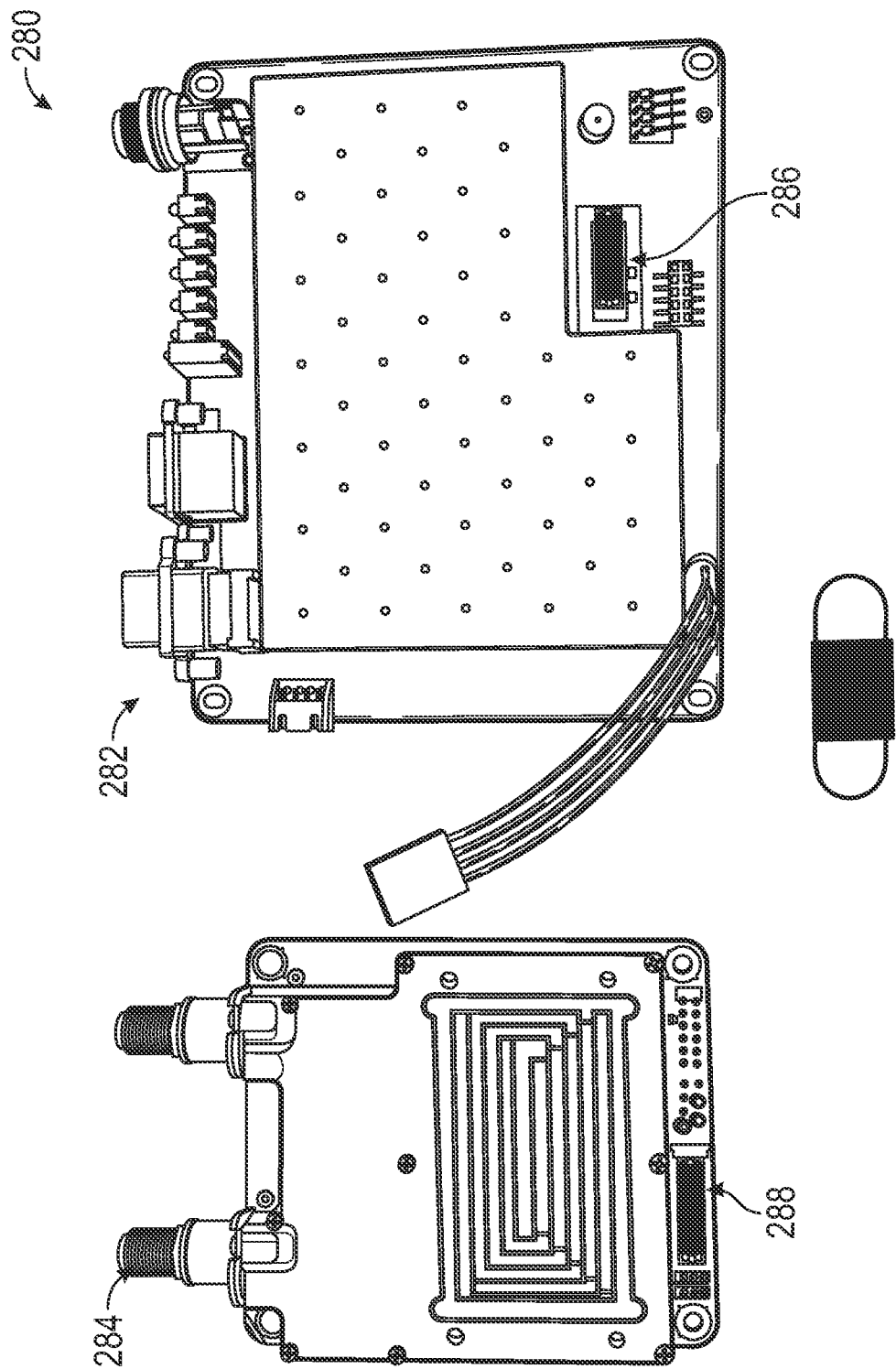

FIG. 2D illustrates an example view 280 of components of a remote transmitter test unit, according to various embodiments of the present technology. As illustrated in the example view 280, the remote transmitter test unit can include a CPU board 282 and a RF board 284. The CPU board 282 can include a connector port 286 to facilitate a connection between the CPU board 282 and the RF board 284. The RF board 284 can include a connector port 288 to facilitate the connection between the CPU board 282 and the RF board 284. In an example embodiment, the connector port 286 of the CPU board 282 and the connector port 288 of the RF board 284 are 40-pin connectors. The connector port 286 of the CPU board 282 and the connector port 288 of the RF board 284 can be connected using a BUS board.

In various embodiments, a remote transmitter test unit can be operated to facilitate sweep testing at various points in a network. The remote transmitter test unit can be deployed at an intermediate point in the network. The remote transmitter test unit can interface with the network via one or more connectors (e.g., F-connectors). While interfaced with the network, the remote transmitter test unit can receive signals from field test units deployed on the network. For example, the remote transmitter test unit can receive a request to conduct a sweep test on the network. The remote transmitter test unit can facilitate the sweep test in response to the request. For example, the remote transmitter test unit can facilitate an on demand forward sweep, as further described herein. In addition, the remote transmitter test unit can generate a sweep profile for conducting a sweep test, as further described herein. The remote transmitter test unit also can provide for Orthogonal Frequency-Division Multiplexing (OFDM) table generation and OFDM sweep testing, as further described herein.

Figure 8A:
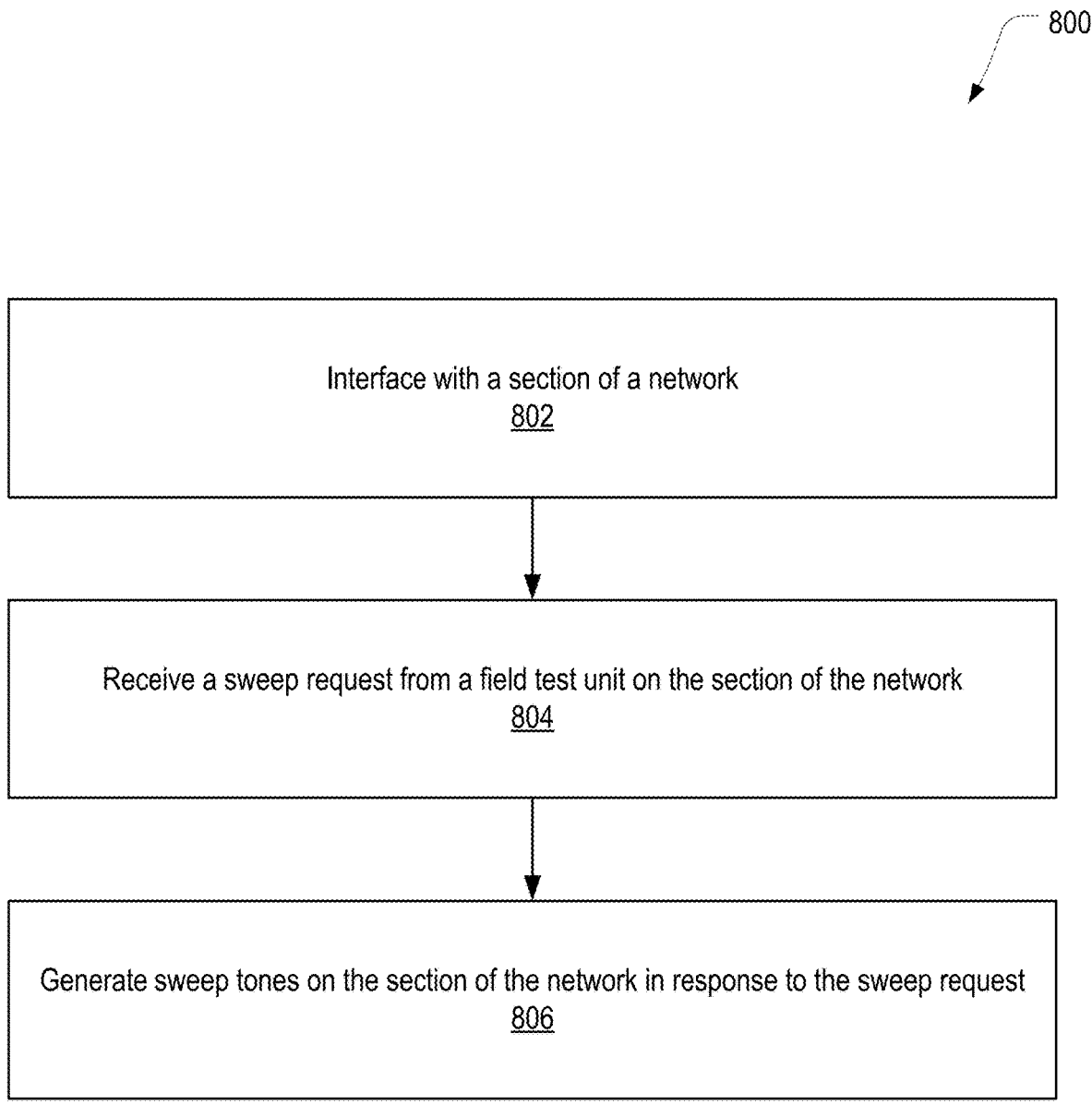
FIGS. 8A-8D illustrate example methods, according to various embodiments of the present technology.

FIG. 8A illustrates an example method 800, according to various embodiments of the present technology. Some or all of the functionality described with respect to the example method 800 can be performed by a remote transmitter test unit, such as the remote transmitter test unit described with respect to FIGS. 2A-2D, or a field test unit. It should be appreciated that there can be additional, fewer, or alternative steps performed in similar or alternative orders, or in parallel, within the scope of the various embodiments discussed herein unless otherwise stated. At block 802, the example method 800 interfaces with a section of a network. At block 804, the example method receives a sweep request from a field test unit on the section of the network. At block 806, the example method generates sweep tones on the section of the network in response to the sweep request.

It is contemplated that there can be many other uses, applications, and/or variations associated with the various embodiments of the present technology. For example, various embodiments of the present technology can learn, improve, and/or be refined over time.

Sweep on-Demand

A traditional headend test unit typically facilitates a sweep test on a cable network by continuously broadcasting sweep tones throughout the cable network. These sweep tones are evaluated to test the frequency response of the cable network. Continuously broadcasting sweep tones throughout the cable network increases the overall power transmitted through the cable network, which can overload the cable network and cause disruptions in service.

The present technology provides improvements over the aforementioned and other disadvantages associated with traditional headend test units. In various embodiments, the present technology provides for on demand sweep testing. For example, a communication channel (e.g., located at a center frequency of 20 MHz) in a network can be established for communication between a headend test unit (or a remote transmitter test unit) and a field test unit. The headend test unit (or the remote transmitter test unit) can listen for a sweep test request from the field test unit. In some cases, the headend test unit (or the remote transmitter test unit) can periodically (e.g., once every 2 minutes) transmit a query message on the communication channel. The field test unit can transmit a sweep test request in response to the query message. Whether transmitted independently or in response to the query message, the sweep test request indicates to the headend test unit (or the remote transmitter test unit) to initiate an on demand sweep test. Upon completion of the sweep test, the headend test unit (or the remote transmitter test unit) can return to listening on the communication channel for a new sweep test request. Thus, the present technology provides for technological solutions to technological challenges by providing on demand sweep testing that can reduce overall power transmitted through a network, thereby reducing disruptions in service caused by overloading the network. More details relating to on demand sweep testing are provided herein.

Figure 3A:
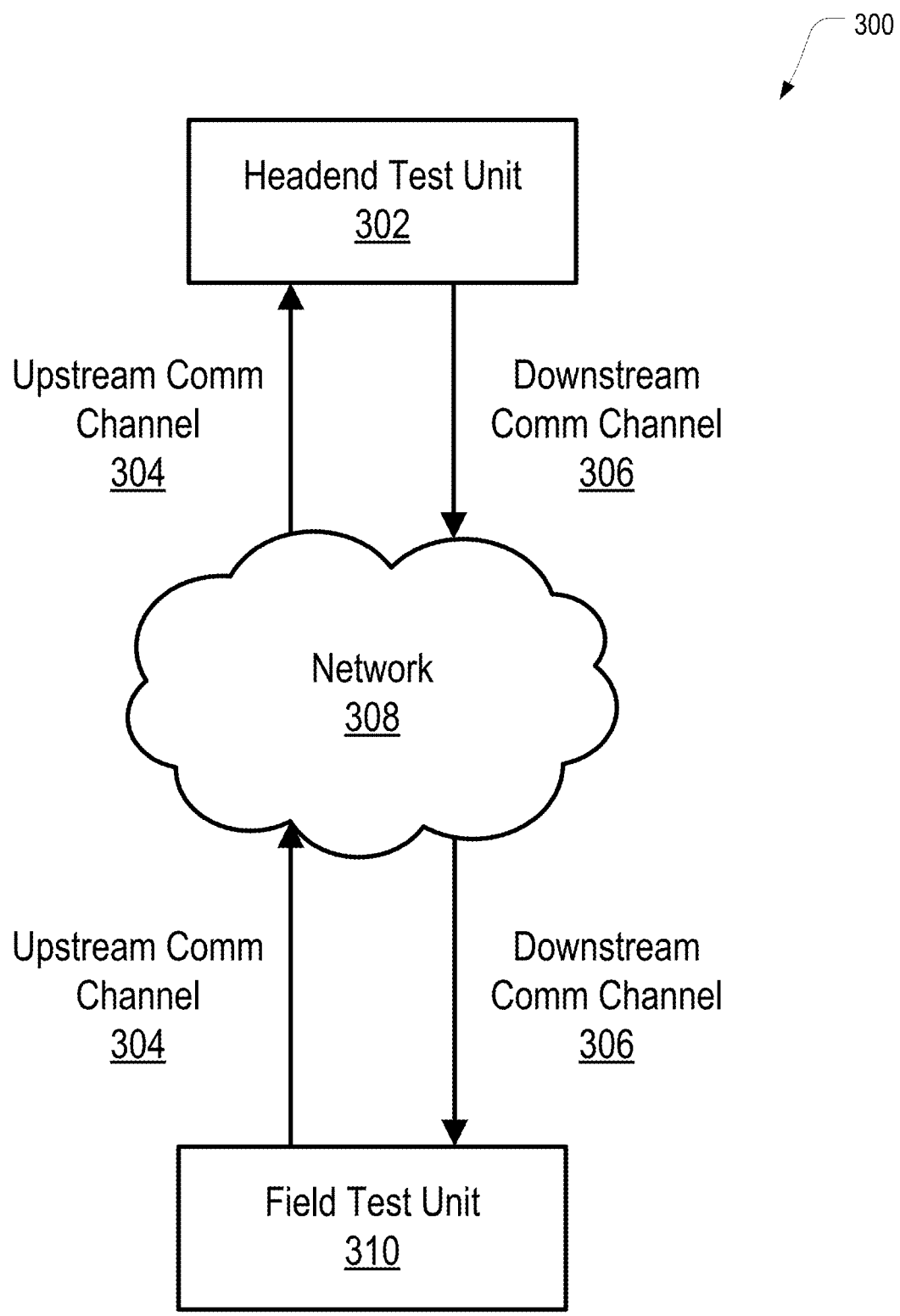
FIG. 3A illustrates an example system including a headend test unit, according to various embodiments of the present technology.

FIG. 3A illustrates an example system 300 including a headend test unit 302, according to various embodiments of the present technology. The components shown in these figures and all figures herein are exemplary only, and other implementations can include additional, fewer, integrated, or different components. Some components may not be shown so as not to obscure relevant details. The example system 300 illustrates examples of a headend test unit 302 that can implement some or all of the functionality of the various embodiments described with respect to the remote transmitter test unit described with respect to FIGS. 2A-2D. It should be understood that there can be additional, fewer, or alternative steps performed in similar or alternative orders, or in parallel, based on the various features and embodiments discussed herein unless otherwise stated.

As illustrated in FIG. 3A, the example system 300 can include the headend test unit 302 connected to a field test unit 310 through a network 308. The network 308 can include a downstream communication channel 306 for downstream traffic from the headend test unit 302 to the field test unit 310. For example, the headend test unit 302 can transmit a query message through the downstream communication channel 306. In addition, the headend test unit 302 can transmit information associated with a sweep test through the downstream communication channel 306. For example, the headend test unit 302 can transmit a sweep profile associated with the sweep test and timing sync messages through the downstream communication channel 306. The network 308 can include an upstream communication channel 304 for upstream traffic from the field test unit 310 to the headend test unit 302. For example, the field test unit 310 can transmit a sweep test request to the headend test unit 302 through the upstream communication channel 304.

FIGS. 3B-3E illustrate example methods, according to various embodiments of the present technology. Some or all of the functionality described with respect to the example methods can be performed by a headend test unit, a remote transmitter test unit (e.g., the remote transmitter test unit described with respect to FIGS. 2A-2D), or a field test unit. It should be appreciated that there can be additional, fewer, or alternative steps performed in similar or alternative orders, or in parallel, within the scope of the various embodiments discussed herein unless otherwise stated.

Figure 3B:
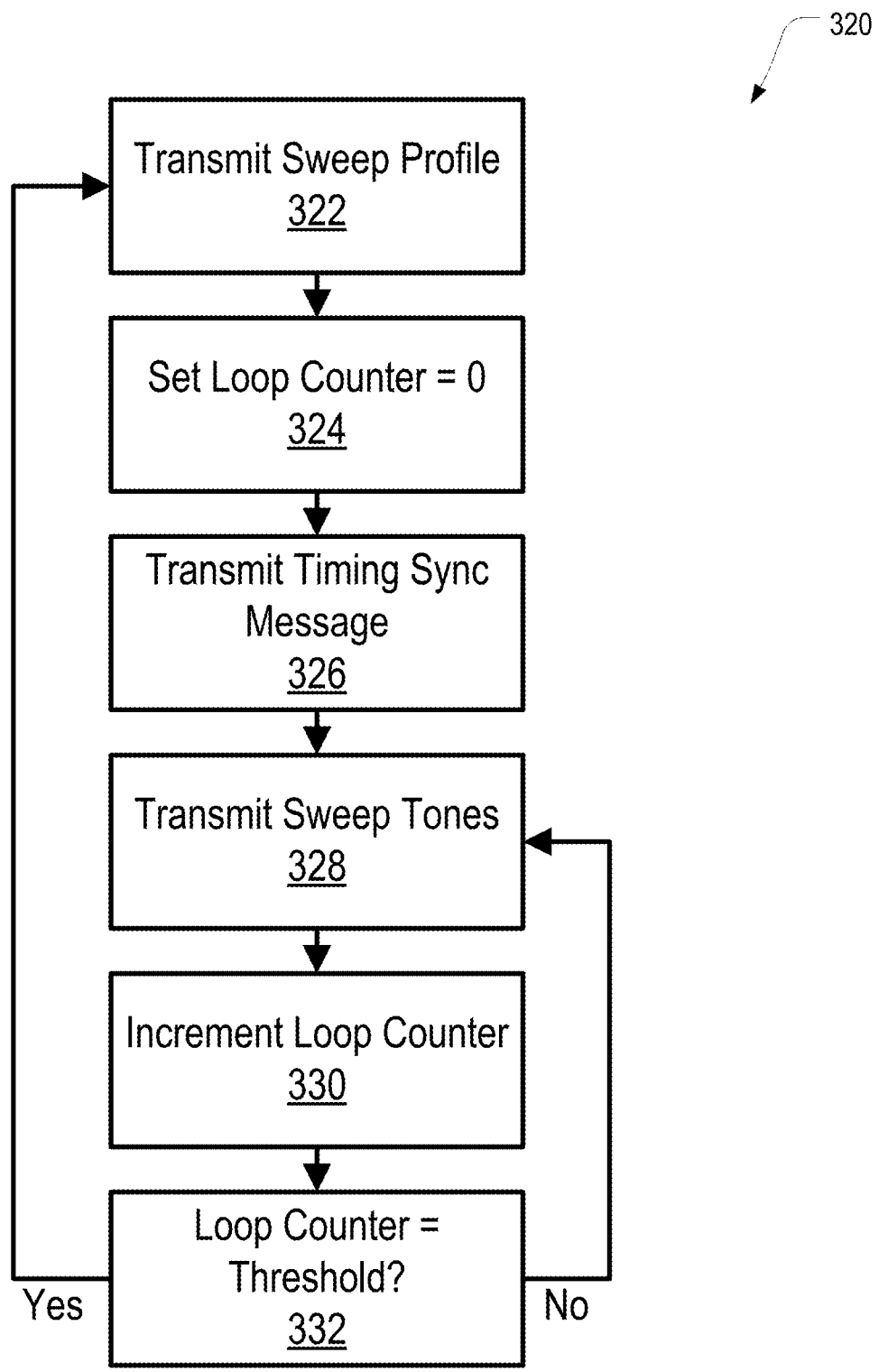
FIGS. 3B-3E illustrate example methods, according to various embodiments of the present technology.

FIG. 3B illustrates an example method 320 associated with continuously transmitting a sweep test, according to various embodiments of the present technology. At block 322, the example method 320 transmits a sweep profile. The sweep profile can include a channel table describing active channels in a network. The sweep profile also can include start frequencies and stop frequencies associated with the active channels in the network. In an example embodiment, a headend test unit (or a remote transmitter test unit) can automatically generate the sweep profile, as further described herein. The headend test unit (or the remote transmitter test unit) transmits the sweep profile to a field test unit through a network. The sweep profile can be associated with a checksum that can be used to determine whether a sweep profile stored on the field test unit needs to be updated. At block 324, the example method 320 sets a loop counter to zero. At block 326, the example method 320 transmits a timing sync message. The timing sync message can provide a reference for a field test unit to synchronize measurement and evaluation of frequency responses on a network with sweep tones transmitted on the network. In an example embodiment, a headend test unit (or a remote transmitter test unit) transmits the timing sync message to a field test unit through a network. At block 328, the example method 320 transmits sweep tones. A field test unit can measure and evaluate the sweep tones as part of a sweep test. At block 330, the example method 320 increments the loop counter. At block 332, the example method 332 determines whether the loop counter satisfies a threshold. The threshold can be associated with a number of times sweep tones are transmitted for a complete sweep test. Based on a determination that the loop counter does not satisfy the threshold and that the sweep test is not completed, the example method 320 returns to block 328 to transmit sweep tones. Based on a determination that the loop counter satisfies the threshold and that the sweep test is completed, the example method 320 returns to block 322 to transmit a sweep profile. In various embodiments, a headend test unit (or a remote transmitter test unit) can continuously transmit a sweep test. By continuously transmitting the sweep test, the headend test unit (or the remote transmitter test unit) can perform sweep tests with field test units that do not have the capability to request an on demand sweep test.

Figure 3C:
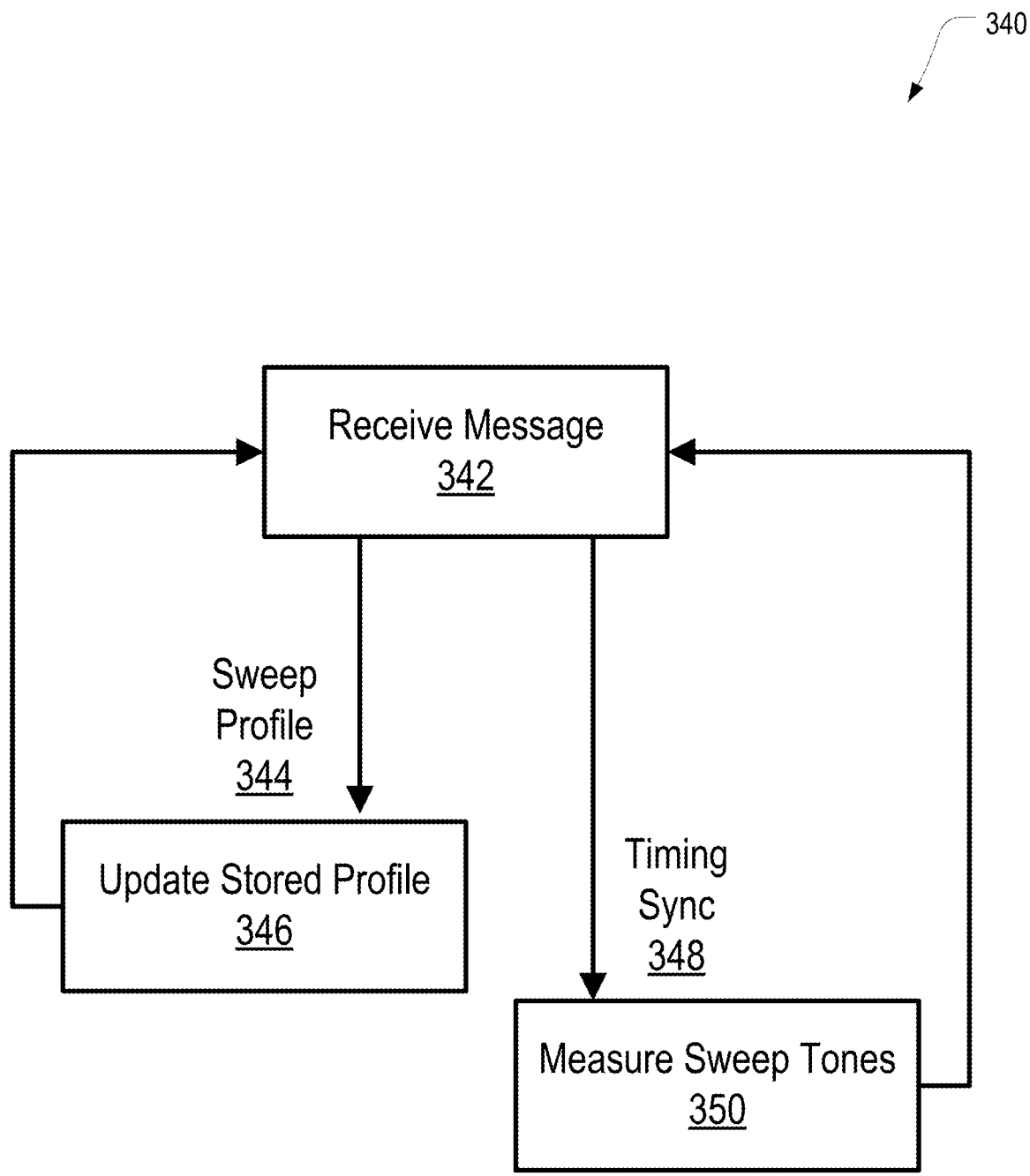

FIG. 3C illustrates an example method 340 associated with receiving a continuously transmitted sweep test, according to various embodiments of the present technology. At block 342, the example method 340 receives a message. In an example embodiment, a field test unit receives a message from a headend test unit (or a remote transmitter test unit). The received message can be a sweep profile message 344 or a timing sync message 348. If the message received is a sweep profile message 344, then, at block 346, the example method updates a stored sweep profile. The stored sweep profile is updated with the information in the sweep profile message. For example, a stored sweep profile including a channel table describing active channels in a network as well as start frequencies and stop frequencies associated with the active channels can be updated with information in a sweep profile message. In some cases, the stored sweep profile is updated based on a comparison of a checksum associated with the sweep profile message and a checksum associated with the stored sweep profile. The stored sweep profile can be updated if the checksum associated with the stored sweep profile does not match the checksum associated with the sweep profile message. The stored sweep profile can be maintained if the checksum associated with the stored sweep profile matches the checksum associated with the sweep profile message. After the update of the stored sweep profile, the example method 340 waits to receive a next message and returns to block 342. If the message received is a timing sync message 348, then, at block 350, the example method 340 measures sweep tones. In general, sweep tones associated with a sweep test follow a timing sync message. The sweep tones can be measured based on receipt of a timing sync message indicating that sweep tones will follow the timing sync message. After measurement of the sweep tones, the example method 340 waits to receive a next message and returns to block 342.

Figure 3D:
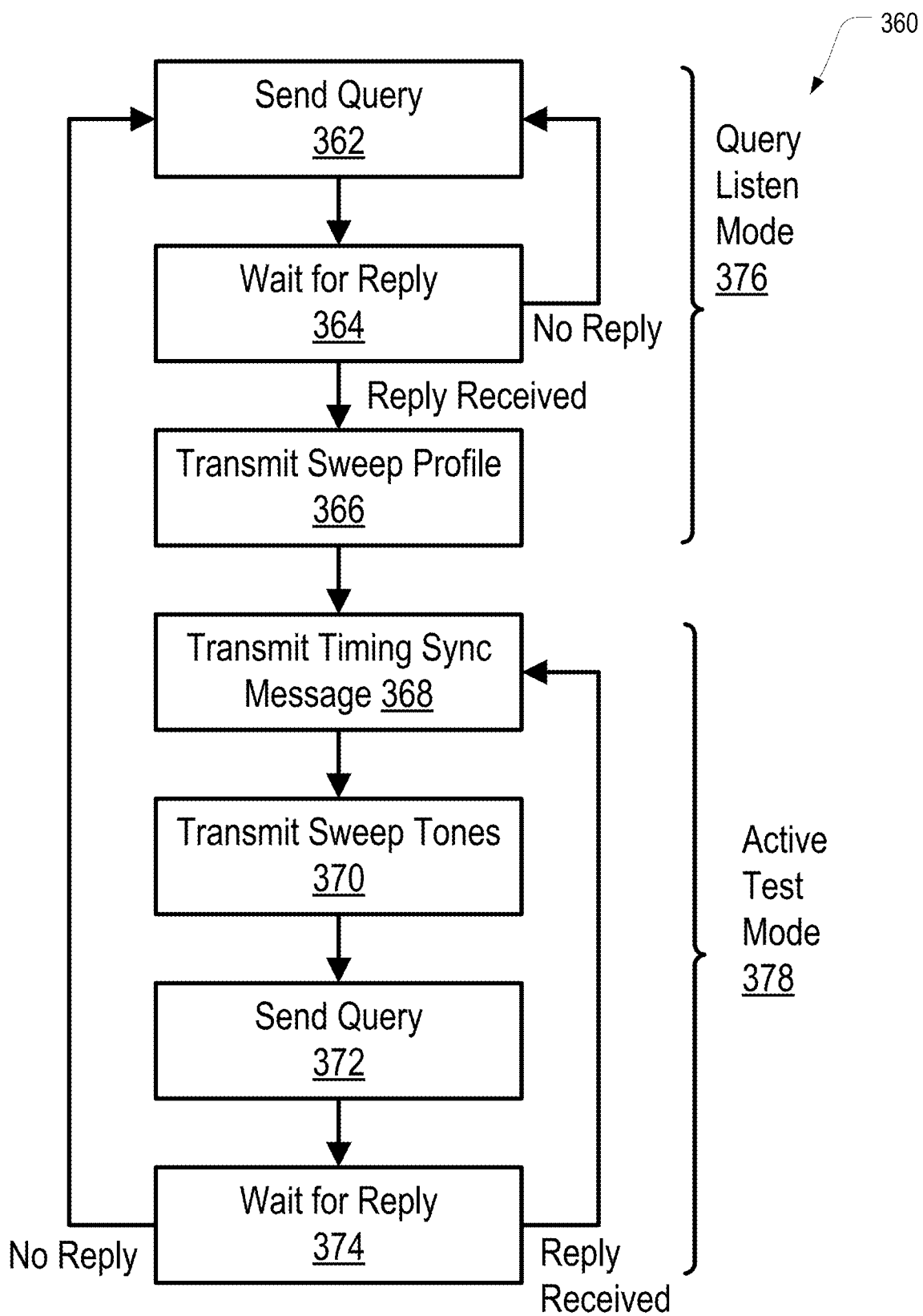

FIG. 3D illustrates an example method 360 associated with transmitting an on demand sweep test, according to various embodiments of the present technology. At block 362, the example method 360 sends a query. In an example embodiment, the query is sent by a remote transmitter test unit (or a headend test unit) to a field test unit through a network. At block 364, the example method 360 waits for a reply. If no reply is received, the example method 360 returns to block 362 and sends another query as part of a query listen mode 376. In an example embodiment, a remote transmitter test unit (or a headend test unit) periodically sends queries and waits for a reply from a field test unit as part of a query listen mode. If a reply is received, then, at block 366, the example method 360 transmits a sweep profile. The sweep profile can include a channel table describing active channels in a network. The sweep profile also can include start frequencies and stop frequencies associated with the active channels in the network. In an example embodiment, a remote transmitter test unit (or a headend test unit) can automatically generate the sweep profile, as further described herein. The remote transmitter test unit (or the headend test unit) transmits the sweep profile to a field test unit through a network. The sweep profile can be associated with a checksum. The field test unit can determine whether a sweep profile stored at the field test unit matches the transmitted sweep profile based on the checksum. The field test unit can update the sweep profile stored at the field test unit if the checksum of the transmitted sweep profile does not match a checksum of the stored sweep profile. The field unit can maintain the stored sweep profile if the checksum of the transmitted sweep profile matches the checksum of the stored sweep profile. At block 368, the example method 360 transmits a timing sync message. The timing sync message can indicate to a field test unit that sweep tones for a sweep test are about to be transmitted. At block 370, the example method 360 transmits sweep tones. In an example embodiment, a sweep test includes a set of sweep tones (e.g., 401 sweep tones) transmitted incrementally for a field test unit to measure and evaluate. At block 372, the example method 360 sends a query. The query can provide an opportunity for a field test unit to reply and request a subsequent sweep test. At block 374, the example method 360 waits for a reply. If a reply is received, the example method 360 returns to block 368 to initiate the subsequent sweep test. Sweep tests can be repeated for as many times as they are requested as part of an active test mode 378. If no reply is received, the example method 360 returns to block 362 and returns to query listen mode 376. In an example embodiment, a remote transmitter test unit can automatically turn off if no reply is received. Not receiving a reply can indicate that an on demand sweep test has ended. As illustrated by the example method 360, an on demand sweep test can be repeated based on replies received from a field test unit. For example, each time a reply is received in response to a query during active test mode, a sweep test can be repeated. In comparison, a continuously transmitted sweep test can repeat a sweep test for a predetermined number of times.

Figure 3E:
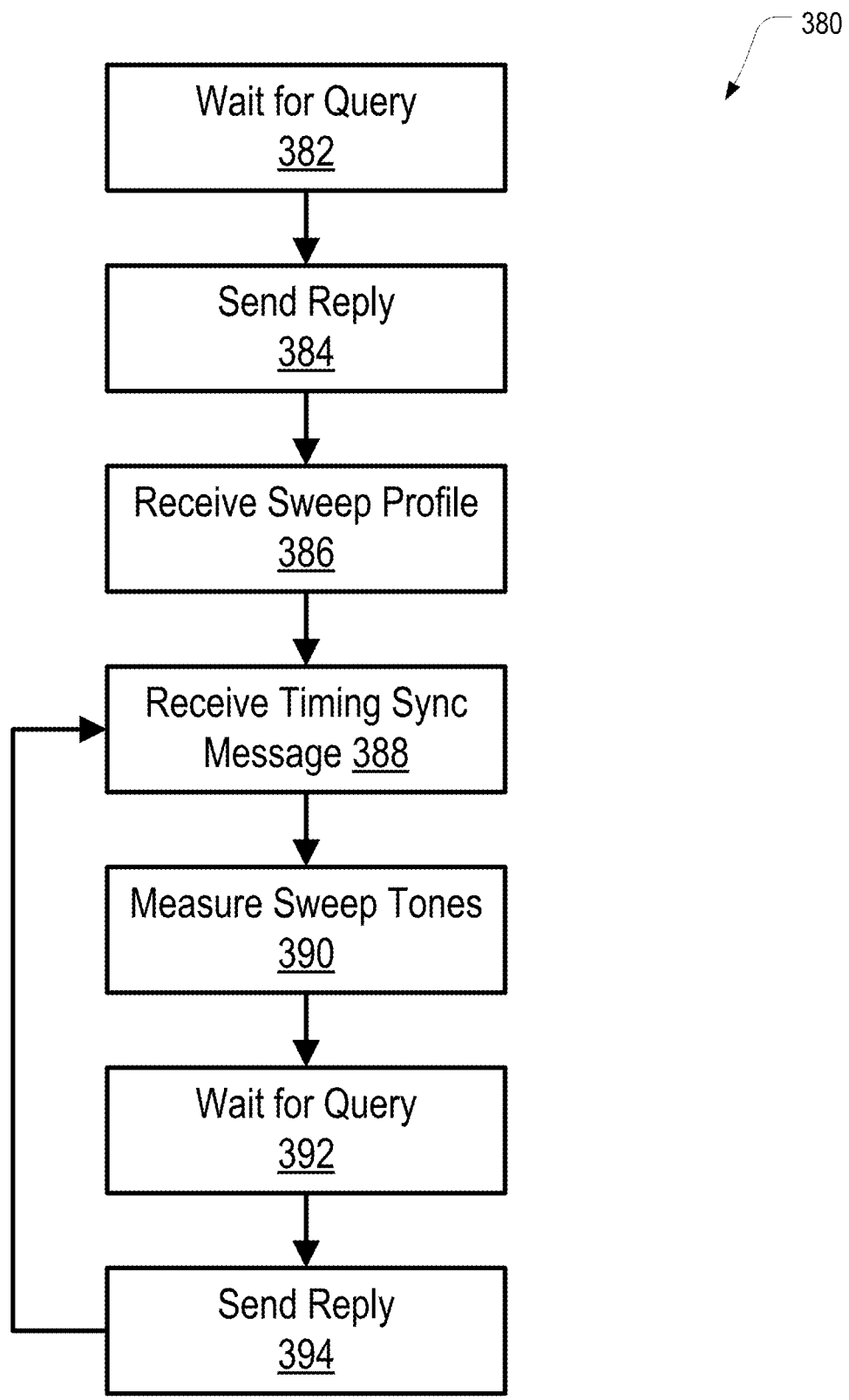

FIG. 3E illustrates an example method 380 associated with requesting an on demand sweep test and receiving the on demand sweep test, according to various embodiments of the present technology. At block 382, the example method 380 waits for a query. In an example embodiment, a field test unit waits for a query from a remote transmitter test unit (or a headend test unit). At block 384, the example method 380 sends a reply. The reply can be sent in response to a query received from a remote transmitter test unit (or a headend test unit). In an example embodiment, a field test unit can send a reply to a query to initiate a sweep test from a remote transmitter test unit (or a headend test unit). At block 386, the example method 380 receives a sweep profile. In an example embodiment, a field test unit can update a stored sweep profile based on a checksum associated with the stored sweep profile and a checksum associated with a received sweep profile. The stored sweep profile can be updated with the received sweep profile if the checksums do not match, and the stored sweep profile can be maintained if the checksums match. At block 388, the example method 380 receives a timing sync message. The timing sync message can indicate that sweep tones for a sweep test are about to be transmitted. At block 390, the example method 380 measures the RF power of the sweep tones. The sweep tones can be part of a sweep test following the timing sync message. At block 392, the example method 380 waits for a query. The query can provide an opportunity to request a new sweep test. At block 394, the example method 380 sends a reply. The reply can request the new sweep test. Upon request of the new sweep test, the example method 380 proceeds to block 388 where a new timing sync message is received, initiating a new sweep test. In an example embodiment, a field test unit can prevent initiation of new sweep tests by ignoring the query and not sending a request for a new sweep test.

In various embodiments, the present technology provides for reverse sweep testing a network. A reverse sweep test can involve a field test unit transmitting sweep tones through a network. For example, a field test unit can establish communications with a headend test unit (or a remote transmitter test unit) through a forward communication channel and a reverse communication channel. In some cases, the field test unit can receive, through the forward communication channel, information related to a frequency on which the reverse communication channel is operating from the headend test unit (or the remote transmitter test unit). Based on the received information, the field test unit can send a message through the reverse communication channel to initiate a reverse sweep test. In some cases, based on receipt of the message, the headend test unit (or the remote transmitter test unit) can transmit to the field test unit a sweep profile for the reverse sweep test through the forward communication channel. The field test unit can conduct the reverse sweep test based on the sweep profile. During the reverse sweep test, the field test unit transmits sweep tones through the network. The headend test unit (or the remote transmitter test unit) can evaluate and measure the received sweep tones to determine a frequency response of the network. The frequency response can be provided to the field test unit through the forward communication channel as a sweep test result.

Figure 4:
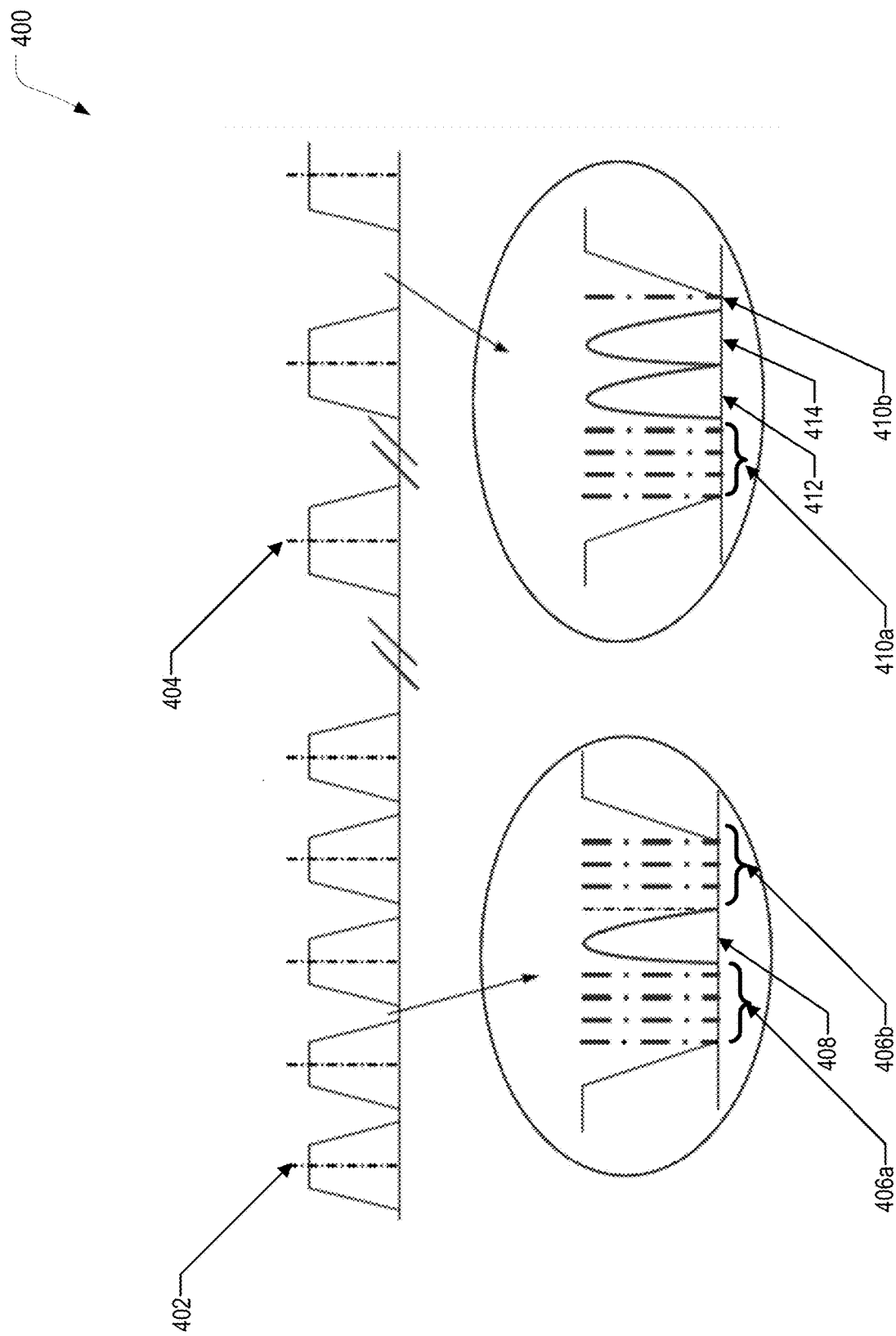
FIG. 4 illustrates an example frequency diagram, according to various embodiments of the present technology.

FIG. 4 illustrates an example frequency diagram 400 associated with forward and reverse sweep tests, according to various embodiments of the present technology. As illustrated in the example frequency diagram 400, a frequency spectrum of a network can include Single Carrier Quadrature Amplitude Modulation (SC-QAM) upstream channels 402 and SC-QAM downstream channels 404. As illustrated in this example, the SC-QAM upstream channels 402 and the SC-QAM downstream channels 404 are frequency ranges spaced apart from each other. In an example sweep test of the network, a field test unit and a headend test unit (or a remote transmitter test unit) can communicate through a forward communication channel 412 and a reverse communication channel 414. In a forward sweep test, the headend test unit (or the remote transmitter test unit) can transmit forward sweep tones 410a, 410b that are received by the field test unit. In a reverse sweep test, the field test unit can transmit reverse sweep tones 406a, 406b to the headend test unit (or the remote transmitter test unit). In this example, a forward communication channel 408 has been established. The reverse sweep tones 406a, 406b are not sent on the forward communication channel 408. As illustrated in this example, the present technology provides for reverse sweep testing in accordance with various embodiments. It should be understood that the various examples described herein with respect to forward sweep testing can be applied to reverse sweep testing unless otherwise stated.

Figure 8B:
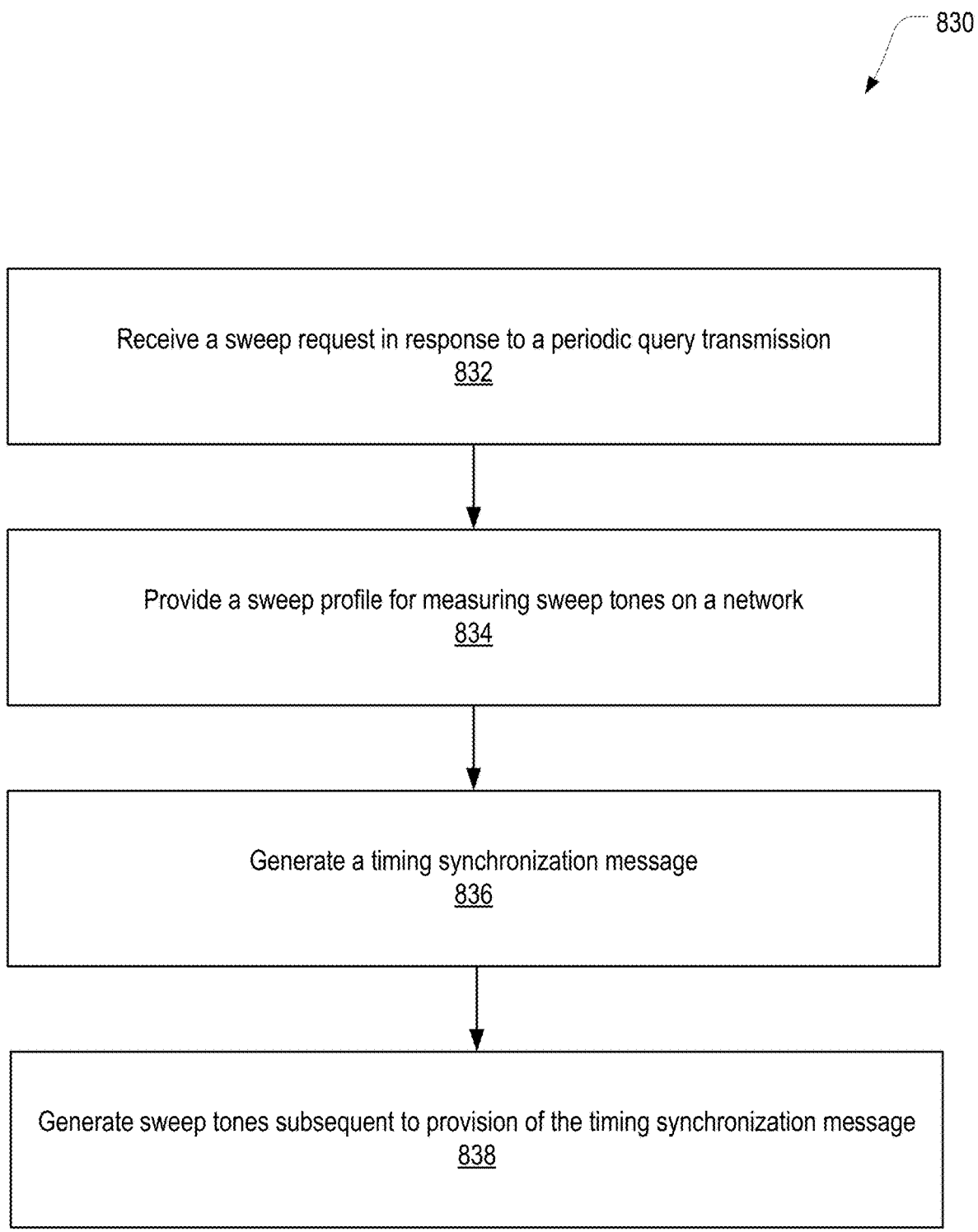

FIG. 8B illustrates an example method 830, according to various embodiments of the present technology. It should be appreciated that there can be additional, fewer, or alternative steps performed in similar or alternative orders, or in parallel, within the scope of the various embodiments discussed herein unless otherwise stated. At block 832, the example method 830 receives a sweep request in response to a periodic query transmission. At block 834, the example method 830 provides a sweep profile for measuring sweep tones on a network. At block 836, the example method 830 generates a timing synchronization message. At block 838, the example method 830 generates sweep tones subsequent to provision of the timing synchronization message.

It is contemplated that there can be many other uses, applications, and/or variations associated with the various embodiments of the present technology. For example, various embodiments of the present technology can learn, improve, and/or be refined over time.

Sweep Profile Auto Generation

A sweep test performed by a traditional headend test unit typically relies on a manually generated sweep profile. The manually generated sweep profile generally consists of manually entered data from a cable network plan associated with a cable network. The process of manually generating a sweep profile can be tedious and prone to human error. Further, because the cable network plan may not accurately reflect the actual frequencies being used on the cable network, the manually generated sweep profile can be inaccurate. Further, because the sweep test performed by the traditional headend test unit is transmitted across the cable network, the manually generated sweep profile cannot account for varying characteristics of different sections of the cable network.

The present technology provides improvements over the foregoing and other disadvantages associated with manually generated sweep profiles. In various embodiments, the present technology provides for automatic generation of a sweep profile for a sweep test. For example, a field test unit can determine spectrum data associated with a network based on a scan of a frequency spectrum on the network. The field test unit can analyze the spectrum data to determine channel characteristics, such as channel frequencies and channel types, associated with channels on the network. Based on the channel characteristics, the field test unit can generate a sweep profile for conducting a sweep test on the network. The sweep profile can include, for example, start frequencies and stop frequencies associated with the channels on the network, a communication frequency for communications from a remote transmitter test unit (or a headend test unit) to the field test unit, guardband frequencies associated with the channels on the network, and transmission levels for sweep tones of the sweep test. The field test unit can store the sweep profile to memory and provide the sweep profile to a remote transmitter test unit (or a headend test unit). The remote transmitter test unit (or the headend test unit) can initiate a sweep test based on the sweep profile. While the foregoing example discussed automatic generation of a sweep profile by a field test unit as just one illustration, headend test units and remote transmitter test units likewise can automatically generate sweep profiles. More details relating to automatic generation of sweep profiles are provided herein.

Figure 5:
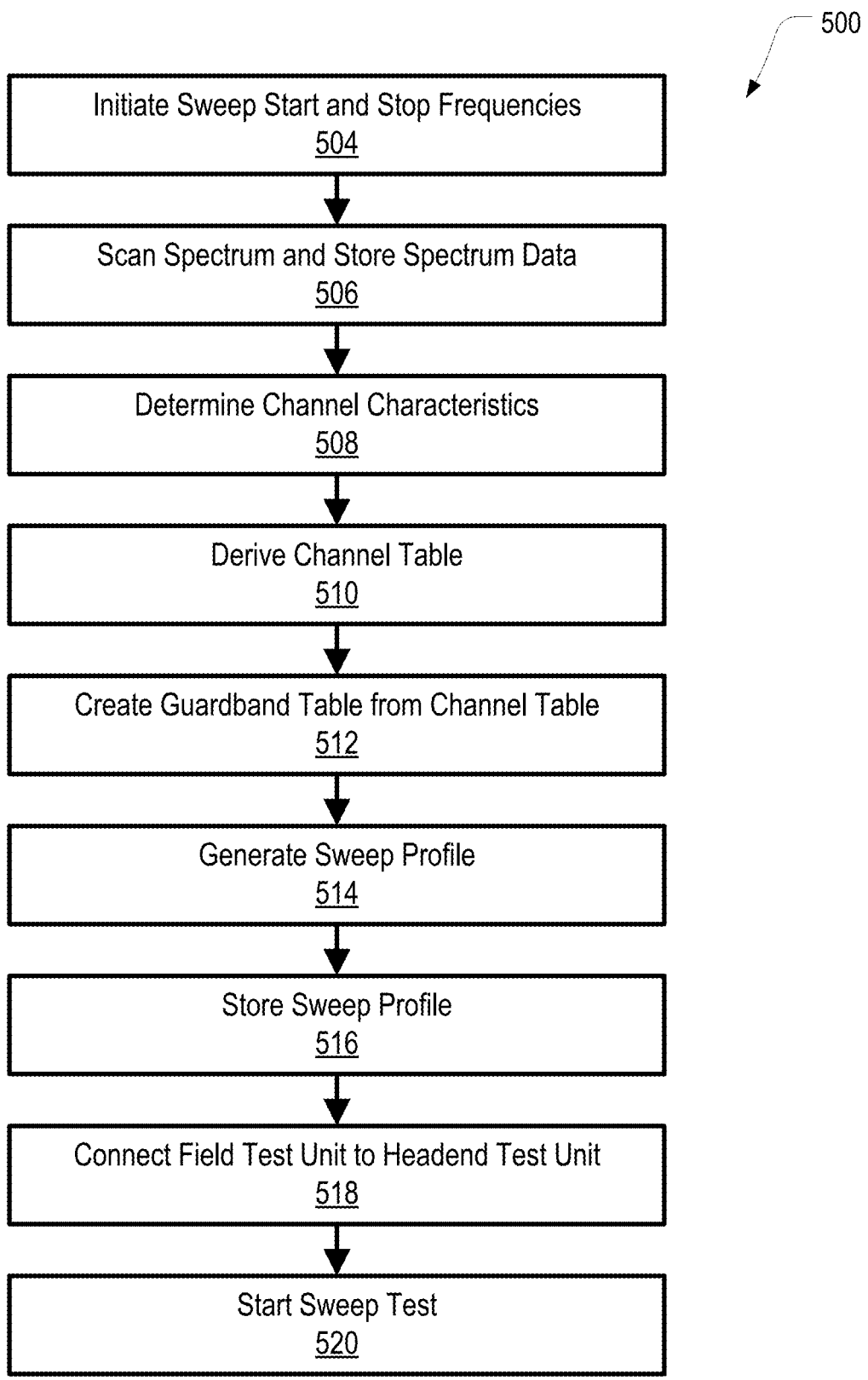
FIG. 5 illustrates an example method, according to various embodiments of the present technology.

FIG. 5 illustrates an example method 500 associated with automatic generation of sweep profiles, according to various embodiments of the present technology. Some or all of the functionality described with respect to the example method 500 can be performed by a headend test unit, a remote transmitter test unit (e.g., the remote transmitter test unit described with respect to FIGS. 2A-2D), or a field test unit. The sweep profiles generated based on the example method 500 can be used in a sweep test, such as the sweep tests described with respect to FIGS. 3A-3E. It should be appreciated that there can be additional, fewer, or alternative steps performed in similar or alternative orders, or in parallel, within the scope of the various embodiments discussed herein unless otherwise stated.

As illustrated in FIG. 5, at block 504, the example method 500 initiates a sweep of start and stop frequencies. In an example embodiment, a user can initiate a sweep of start and stop frequencies through an input command provided to a field test unit(or a headend test unit or remote transmitter test unit). At block 506, the example method 500 scans a frequency spectrum of a network and stores spectrum data. In an example embodiment, the field test unit (or the headend test unit or remote transmitter test unit) scans a frequency spectrum on a network and stores spectrum data associated with the network. The spectrum data can include, for example, amplitudes and phases of frequencies transmitted through the network. At block 508, the example method 500 determines channel characteristics associated with the network. In an example embodiment, the field test unit (or the headend test unit or remote transmitter test unit) determines channel characteristics, such as channel frequencies and channel types, associated with channels on the network. Channel frequencies can include, for example, start frequencies associated with a frequency at which a channel starts and stop frequencies associated with a frequency at which the channel stops. For example, a television channel can be 6 MHz wide and start at, for example, 54 MHz and stop at, for example, 60 MHz. Channel types can include, for example, analog signals, digital signals (e.g., QAM, ISDB-T), and Orthogonal Frequency-Division Multiplexing (OFDM) signals, which can be a type of digital signal. At block 510, the example method 500 derives a channel table. In an example embodiment, the field test unit (or the headend test unit or remote transmitter test unit) derives a channel table based on the channel characteristics associated with the channels on the network. The channel table can describe active channels in the network, including the channel characteristics associated with the active channels. At step 512, the method 500 creates a guardband table from the channel table. A guardband can be a narrow frequency range that separates two ranges of frequency. The guardband allows the two ranges to avoid interference from each other. In an example embodiment, the field test unit (or the headend test unit or remote transmitter test unit) creates a guardband table that identifies frequency ranges of guardbands in a channel network. A frequency range of a guardband in the guardband table can be identified by a frequency, a value above the frequency indicating an upper bound of the frequency range, and a value below the frequency indicating a lower bound of the frequency range. The frequency range of the guardband in the guardband table can be associated with a flag indicating that a sweep tone is not to be transmitted in the frequency range. In this regard, a sweep test can avoid transmitting sweep tones at frequency ranges indicated by the guardband table as frequency ranges where sweep tones are not to be transmitted to avoid interference to channels in the network. Flags in the guardband table can also indicate other actions to be performed with respect to the frequency ranges. For example, a flag in the guardband table can indicate an associated frequency range is to be measured. In some cases, the flag can indicate that a frequency is to be measured by peak power or to be measured by average power. At step 514, the method 500 generates a sweep profile. The sweep profile can be generated based on, for example, the channel characteristics, the channel table, and the guardband table. In an example embodiment, the field test unit (or the headend test unit or remote transmitter test unit) generates the sweep profile to include start frequencies and stop frequencies associated with channels in the network, a forward communication channel in a section of empty spectrum for communication with a remote transmitter test unit (or a headend test unit), a guardband table, and a sweep test transmission level. The sweep test transmission level (or power) can be based on an average channel power. For example, a sweep test transmission level can be 15 dB below an average channel power of a network. In general, a sweep test transmission level that is too low can result in sweep tones that are unstable, resulting in unstable measurements. A sweep test transmission level that is too high can overload a network and cause interference to neighboring frequencies. At block 516, the example method 500 stores the sweep profile. The sweep profile can be stored in a data store of the field test unit (or the headend test unit or remote transmitter test unit). At block 518, the example method 500 connects the field test unit to a headend test unit (or a remote transmitter test unit). The field test unit can connect to the headend test unit (or the remote transmitter test unit), via a communication channel in the network or, in some cases, via a connection outside the network. The sweep profile can be transferred to the headend test unit (or the remote transmitter test unit) via the communication channel, or the sweep profile can be transferred to the field test unit from the headend test unit (or the remote transmitter test unit). At block 520, the example method 500 starts a sweep test. The sweep test can be conducted based on the sweep profile.

Figure 8C:
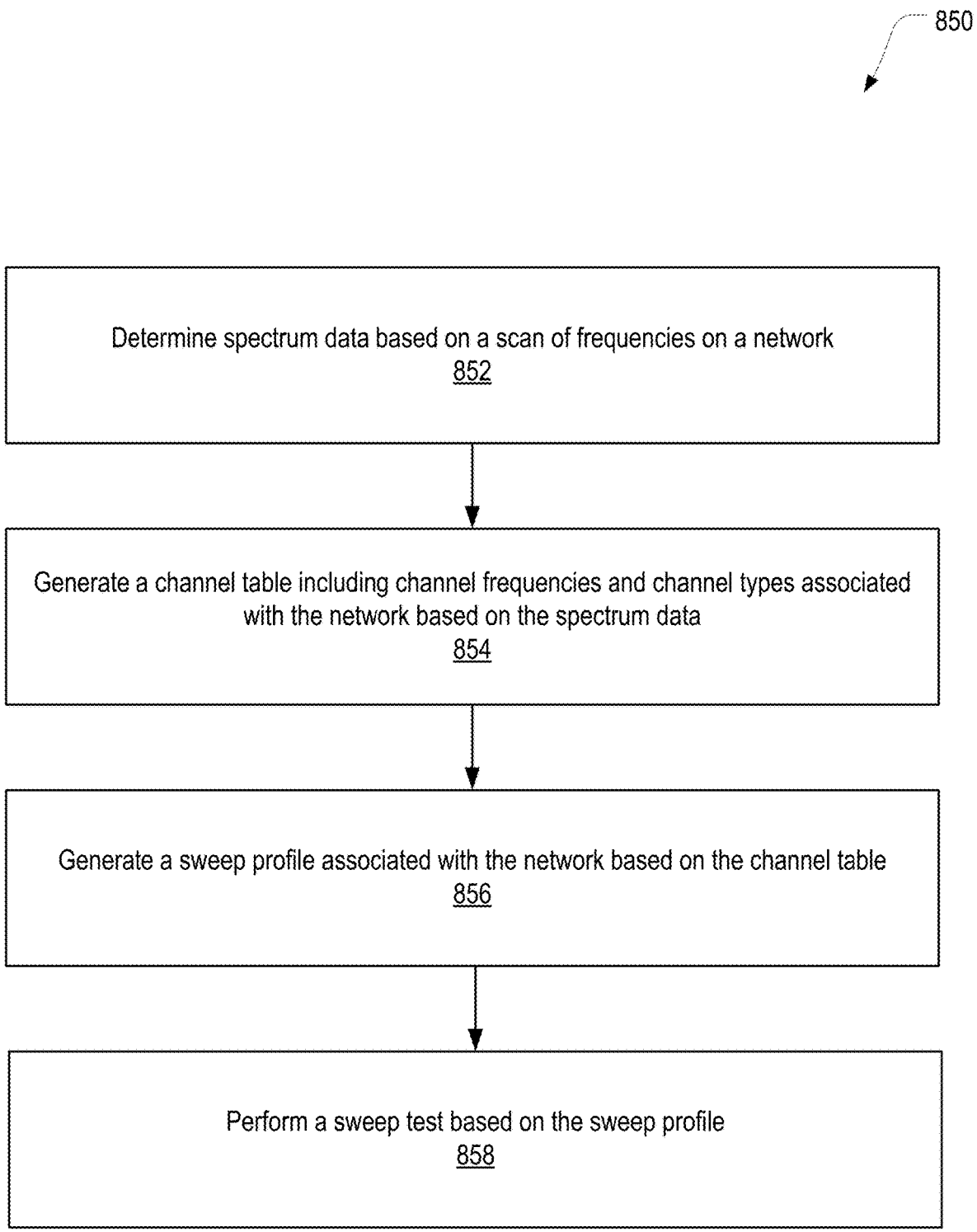

FIG. 8C illustrates an example method 850, according to various embodiments of the present technology. It should be appreciated that there can be additional, fewer, or alternative steps performed in similar or alternative orders, or in parallel, within the scope of the various embodiments discussed herein unless otherwise stated. At block 852, the example method 850 determines spectrum data based on a scan of frequencies on a network. At block 854, the example method 850 generates a channel table including channel frequencies and channel types associated with the network based on the spectrum data. At block 856, the example method 850 generates a sweep profile associated with the network based on the channel table. At block 858, the example method 850 performs a sweep test based on the sweep profile.

It is contemplated that there can be many other uses, applications, and/or variations associated with the various embodiments of the present technology. For example, various embodiments of the present technology can learn, improve, and/or be refined over time.

OFDM Table Generation and Sweeping

A sweep test performed by a traditional headend test unit typically does not account for Orthogonal Frequency-Division Multiplexing (OFDM) channels in a network. In general, OFDM channels occupy a large, continuous portion of a cable frequency spectrum. A typical OFDM channel can have a bandwidth between 24 MHz and 192 MHz. Because of the continuous nature of the OFDM channel, traditional sweep tones cannot be inserted in the OFDM channel. Thus, the sweep test performed by the traditional headend test unit does not account for OFDM channels.

The present technology provides improvements over the aforementioned and other disadvantages associated with sweep tests performed by traditional headend test units. In various embodiments, the present technology provides for Orthogonal Frequency-Division Multiplexing (OFDM) table generation and OFDM sweep testing. For example, an OFDM table can be generated based on pilot subchannels, or OFDM pilots, in OFDM channels. A sweep test can include the OFDM pilots as frequencies at which to measure frequency responses. Thus, the sweep test can account for OFDM channels. More details relating to OFDM table generation and OFDM sweep testing are provided herein.

Figure 6A:
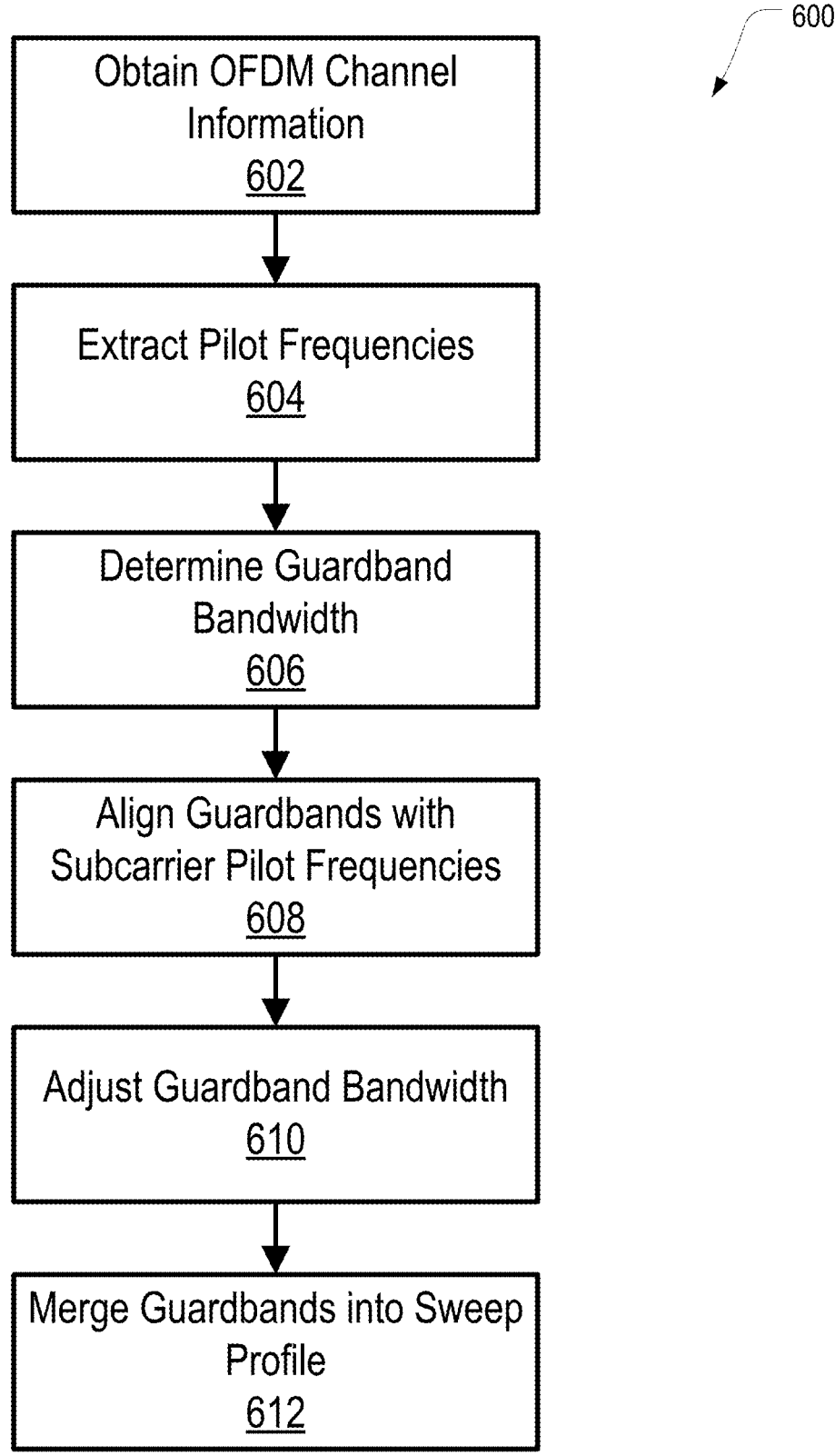
FIG. 6A illustrates an example method, according to various embodiments of the present technology.

FIG. 6A illustrates an example method 600 associated with OFDM table generation and OFDM sweep testing, according to various embodiments of the present technology. Some or all of the functionality described with respect to the example method 600 can be performed by a headend test unit, a remote transmitter test unit (e.g., the remote transmitter test unit described with respect to FIGS. 2A-2D), or a field test unit. The OFDM tables generated based on the example method 600 can be included in an automatically generated sweep profile, such as the sweep profiles described with respect to FIG. 5. The OFDM sweep test described with respect to the example method 600 can be incorporated in a sweep test, such as the sweep tests described with respect to FIGS. 3A-3E. It should be appreciated that there can be additional, fewer, or alternative steps performed in similar or alternative orders, or in parallel, within the scope of the various embodiments discussed herein unless otherwise stated.

As illustrated in FIG. 6A, at block 602, the example method 600 obtains OFDM channel information. In an example embodiment, a field test unit obtains OFDM channel information from a physical link channel (PLC) within an OFDM channel. The PLC can carry an OFDM Channel Description (OCD) message that contains the OFDM channel information. At block 604, the example method 600 extracts pilot frequencies. In an example embodiment, a field test unit extracts pilot frequencies from the OFDM channel information obtained from the OCD message delivered through the PLC within the OFDM channel. The OFDM channel information in the OCD message can include, for example, an OFDM channel ID, subchannel spacing, and subchannel assignments for the OFDM channel. The OFDM channel information in the OCD message can also indicate which subchannels are pilot subchannels. The frequencies corresponding to the pilot subchannels can be the pilot frequencies. At block 606, the example method 600 determines guardband bandwidth. The guardband bandwidth can be determined based on spacing from a measurement point. In an example embodiment, a field test unit identifies frequency ranges of pilot subchannels based on OFDM channel information in an OCD message. The OFDM channel information in the OCD message can include subchannel spacing and subchannel assignments from which the frequency ranges of the pilot subchannels can be determined. At block 608, the example method 600 aligns OFDM guardbands with subcarrier pilot frequencies. A guardband can be a frequency range associated with a flag indicating the frequency range is to be skipped or measured. In an example embodiment, a field test unit can align OFDM guardbands with the frequency ranges of the pilot subchannels and associate the OFDM guardbands with flags indicating the frequency ranges of the pilot subchannels are to be measured by their average power. At block 610, the example method 600 adjusts OFDM guardband bandwidth. The OFDM guardband bandwidth can be adjusted to avoid interference from neighboring frequencies of the OFDM guardbands. At block 612, the example method 600 merges OFDM guardbands into a sweep profile. The OFDM guardbands can be included in a sweep profile for conducting a sweep test. During a sweep test, the OFDM guardbands can indicate subcarrier pilot frequencies in OFDM channels of a cable network. The sweep profile can identify the subcarrier pilot frequencies in the OFDM channels to be measured in the sweep test. Sweep tones can be prevented from being transmitted at the OFDM guardbands. The frequency response of the OFDM guardbands can be measured based on the subcarrier pilot frequencies associated with the OFDM guardbands.

Figure 6B:
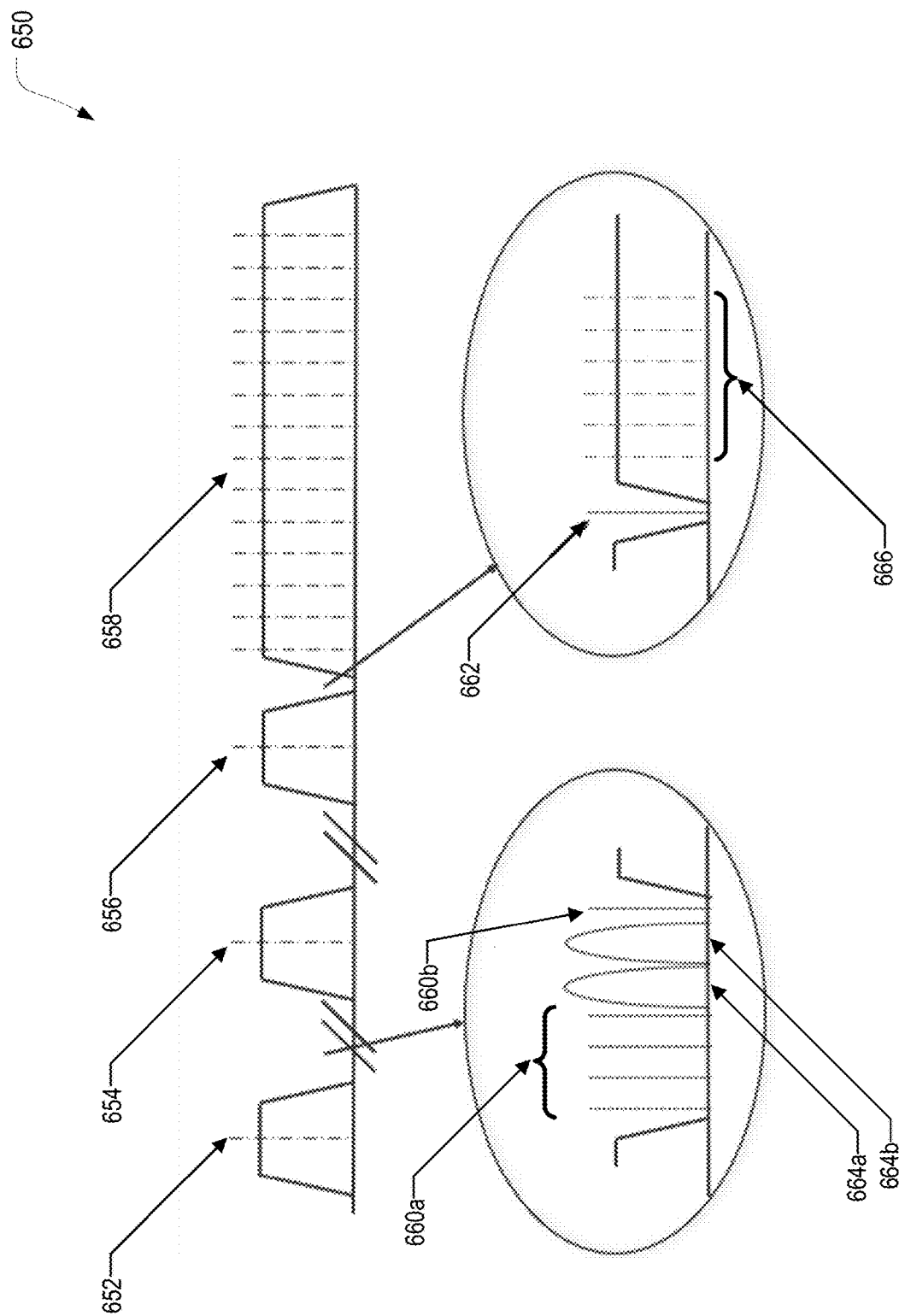
FIG. 6B illustrates an example frequency diagram, according to various embodiments of the present technology.

FIG. 6B illustrates an example frequency diagram 650 associated with a sweep test including OFDM channels, according to various embodiments of the present technology. As illustrated in the example frequency diagram 650, a frequency spectrum of a network can include Single Carrier Quadrature Amplitude Modulation (SC-QAM) channels 652, 654, 656 and an OFDM channel 658. As illustrated in this example, the SC-QAM channels 652, 654, 656 are frequency ranges spaced apart from each other. The OFDM channel 658 is a continuous frequency range. The OFDM channel 658 can include subcarrier pilot frequencies 666. In an example sweep test of the network, sweep tones 660a, 660b can be transmitted in the space between the SC-QAM channels 652, 654, 656. The sweep tones 660a, 660b can be measured and, based on frequency responses of the sweep tones 660a, 660b, faults can be identified in the network. Faults can be identified, for example, based on an RF power of a sweep tone failing to satisfy a threshold RF power. Further, communication channels 664a, 664b can be determined in the space between the SC-QAM channels 652, 654, 656. For example, the communication channels 664 can include a forward communication channel for communication from a headend test unit, (or a remote transmitter test unit), to a field test unit and a reverse communication channel for communication from the field test unit to the headend test unit (or the remote transmitter test unit). In the example sweep test of the network, sweep tones 662 can be transmitted in the space between the SC-QAM channel 656 and the OFDM channel 658. The sweep tone(s) 662 can be measured and, based on frequency responses of the sweep tone(s) 662, faults can be identified in the network. In the example sweep test of the network, subcarrier pilot frequencies 666 can be measured and, based on frequency responses of the subcarrier pilot frequencies 666, faults can be identified in the network.

FIGS. 7A-7G illustrate example frequency diagrams, according to various embodiments of the present technology. In various embodiments, the example frequency diagrams can be associated with example scenarios that can be encountered during a sweep test.

Figure 7A:
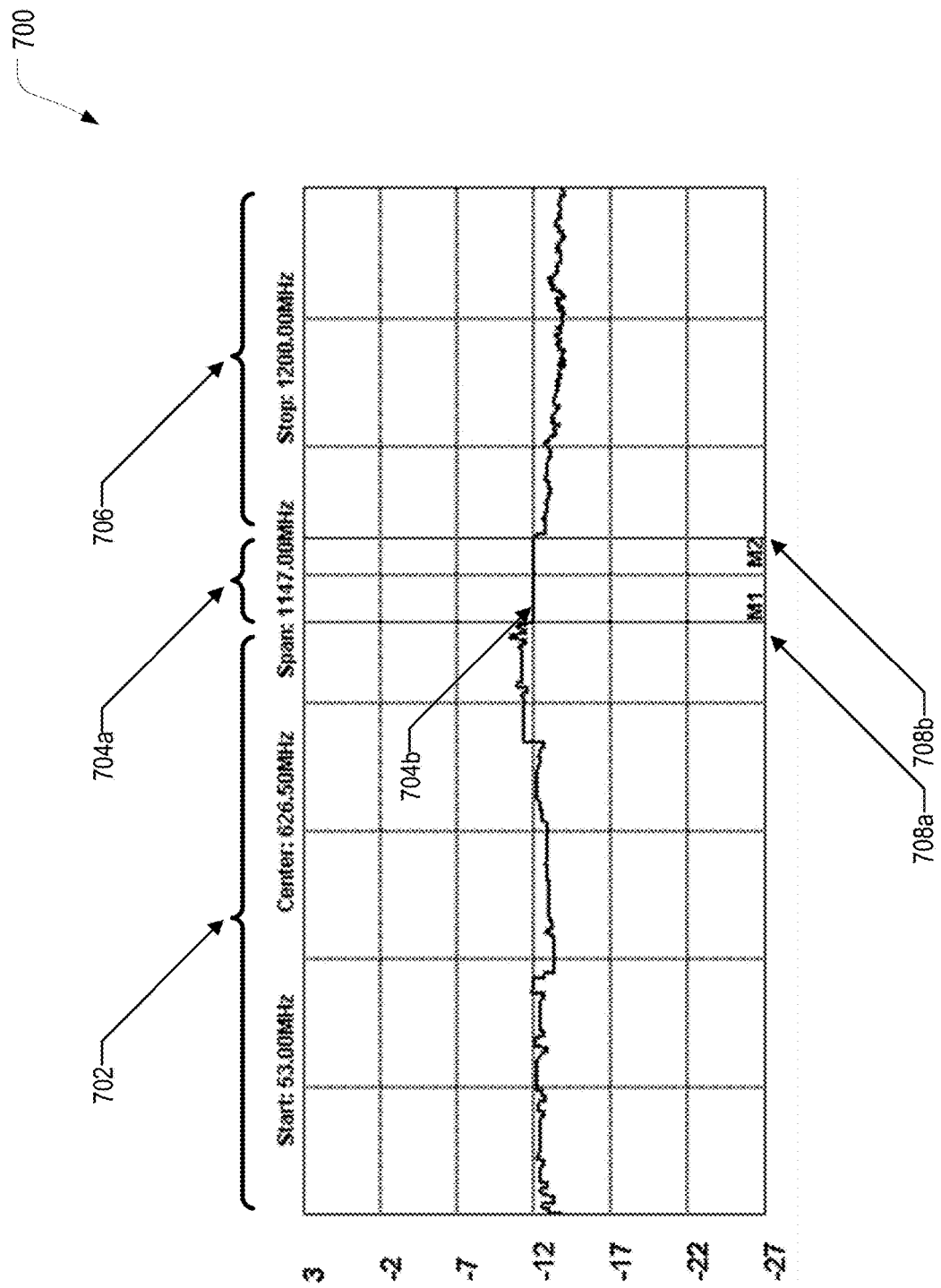
FIGS. 7A-7G illustrate example frequency diagrams, according to various embodiments of the present technology.

FIG. 7A illustrates an example frequency diagram 700 associated with a sweep test without OFDM sweeping, according to various embodiments of the present technology. As illustrated in FIG. 7A, the frequency diagram 700 shows measured power levels of various sweep tones generated during the sweep test. Frequency markers 708a, 708b mark the beginning frequency and the ending frequency of the OFDM channel. In a first section 702 of the frequency diagram 700, the frequency diagram 700 shows the measured power levels of sweep tones generated for frequencies lower than an OFDM channel. In a second section 704a of the frequency diagram 700, the frequency diagram 700 shows a flat line 704b for the frequencies of the OFDM channel. The flat line indicates a lack of measured power levels for the frequencies of the OFDM channel. Because sweep tones are not generated in the OFDM channel, a sweep test that only measures generated sweep tones does not measure the power levels associated with the OFDM channel. In a third section 706 of the frequency diagram 700, the frequency diagram 700 shows the measured power levels of sweep tones generated for frequencies higher than the OFDM channel. As illustrated in FIG. 7A, there are no apparent faults in the first section 702 and the third section 706. Whether there are faults in the OFDM channel is unknown.

Figure 7B:
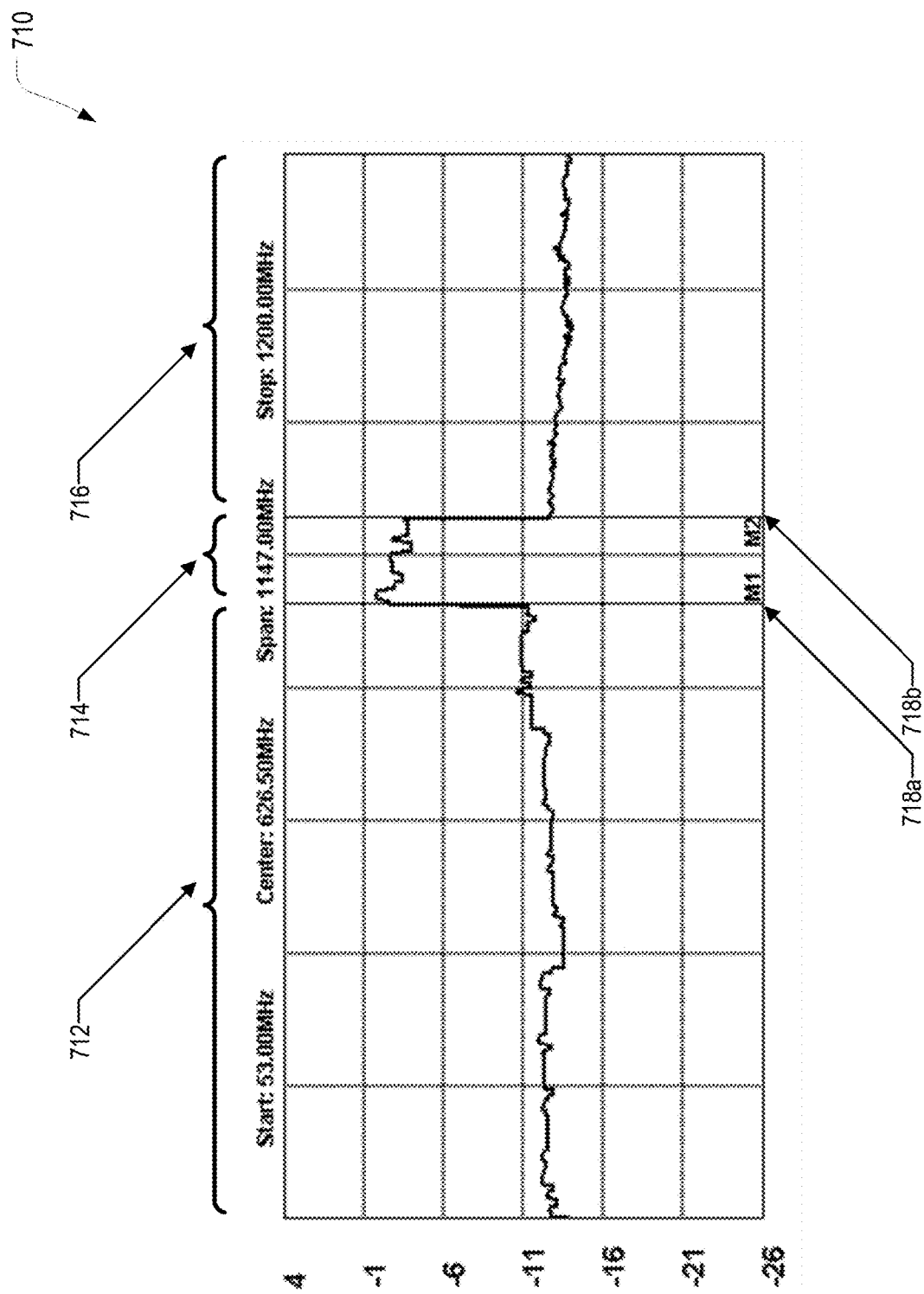

FIG. 7B illustrates an example frequency diagram 710 associated with a sweep test with OFDM sweeping, according to various embodiments of the present technology. The example frequency diagram 710 can be associated with a sweep test of the same network as the sweep test associated with example frequency diagram 700 in FIG. 7A. As illustrated in FIG. 7B, the frequency diagram 710 shows measured power levels of various sweep tones generated during the sweep test and measured power levels of guardband frequencies in an OFDM channel. Frequency markers 718a, 718b mark the beginning frequency and the ending frequency of the OFDM channel. In a first section 712 of the frequency diagram 710, the frequency diagram 710 shows the measured power levels of sweep tones generated for frequencies lower than the OFDM channel. In a second section 714 of the frequency diagram 710, the frequency diagram 710 shows measured power levels of guardband frequencies of the OFDM channel. Because sweep tones are not generated in the OFDM channel, a sweep test with OFDM sweeping measures the guardband frequencies of the OFDM channel. In a third section 716 of the frequency diagram 710, the frequency diagram 710 shows the measured power levels of sweep tones generated for frequencies higher than the OFDM channel. In this example, the measured power levels of the guardband frequencies of the OFDM channel are higher than the measured power levels of the generated sweep tones in the first section 712 and the third section 716. The measured power levels of the guardband frequencies of the OFDM channel can be evaluated against the nominal power levels of the guardband frequencies. The measured power levels of the generated sweep tones can be evaluated against the power levels at which the sweep tones were generated. As illustrated in FIG. 7B, there are no apparent faults in the first section 712, the second section 714, and the third section 716.

Figure 7C:
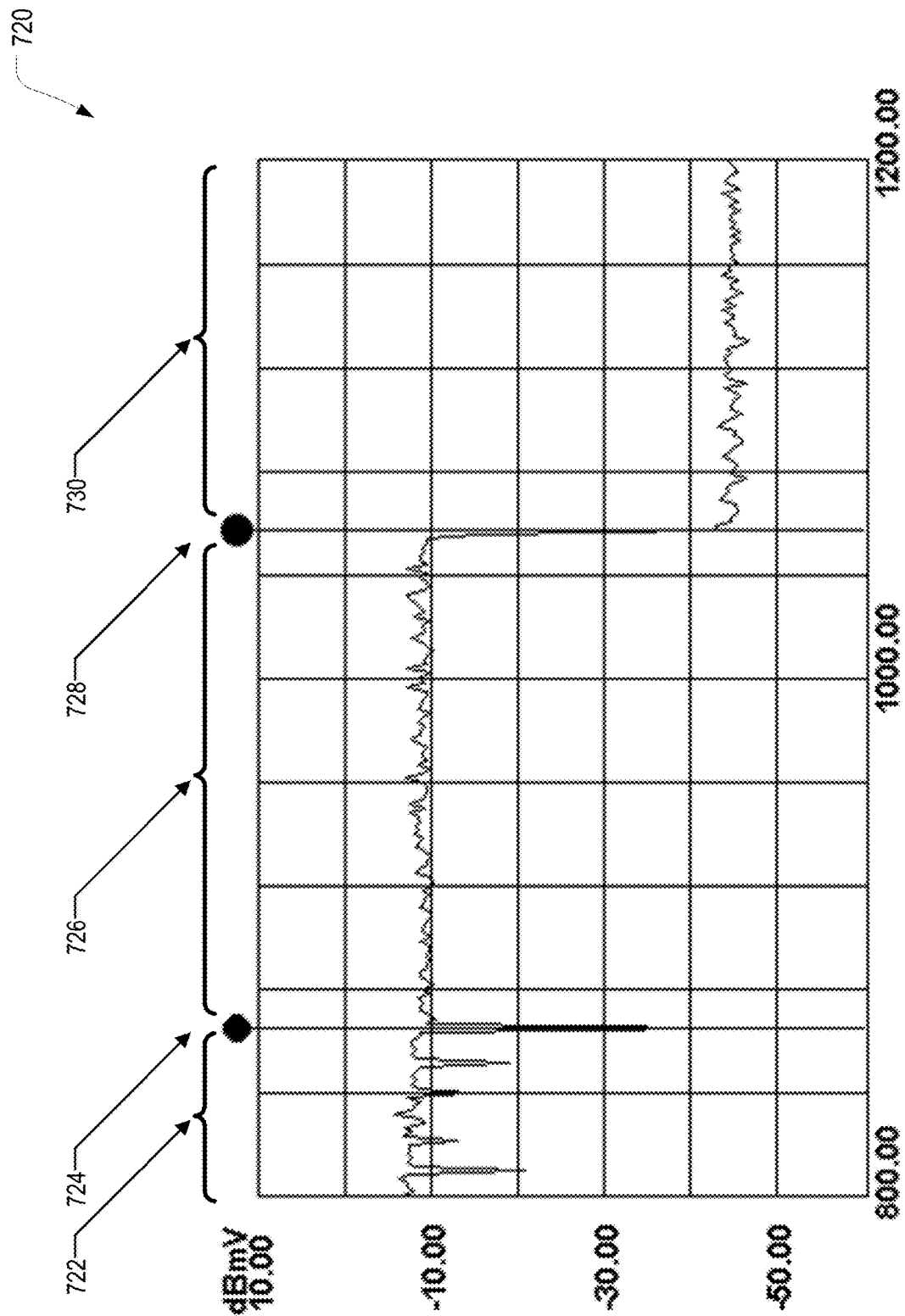

FIG. 7C illustrates an example frequency diagram 720 associated with a sweep test, according to various embodiments of the present technology. As illustrated in FIG. 7C, the frequency diagram 720 shows power levels of frequencies on a network including an OFDM channel. Frequency markers 724, 728 mark the beginning frequency and the ending frequency of the OFDM channel. In a first section 722 of the frequency diagram 720, the frequency diagram 722 shows power levels of frequencies lower than the OFDM channel. In a second section 726 of the frequency diagram 720, the frequency diagram 720 shows power levels of frequencies of the OFDM channel. In a third section 730 of the frequency diagram 720, the frequency diagram 720 shows power levels of frequencies higher than the OFDM channel. As illustrated in FIG. 7C, there are no apparent faults in the first section 722, the second section 726, and the third section 730.

Figure 7D:
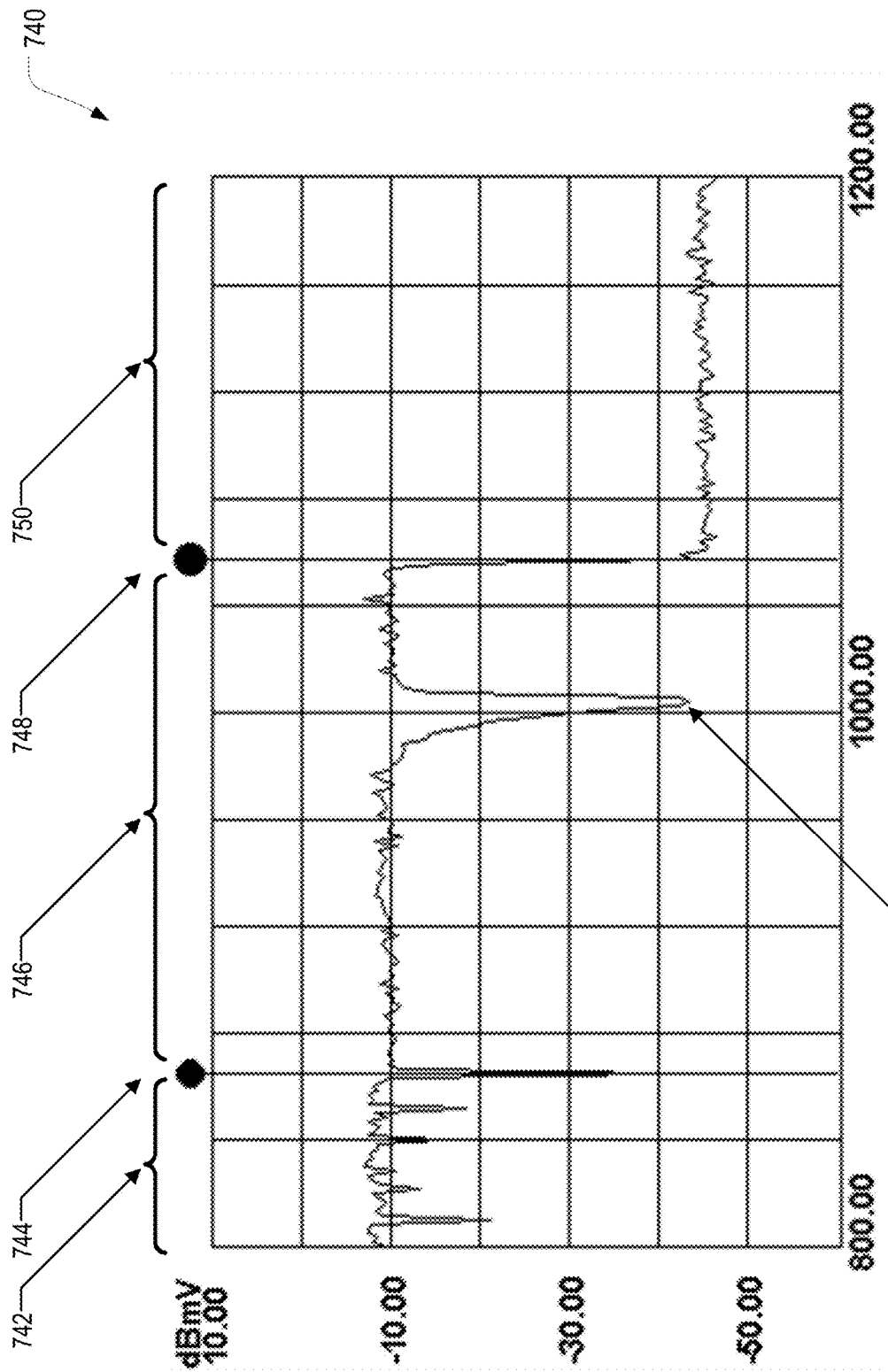

FIG. 7D illustrates an example frequency diagram 740 associated with a sweep test, according to various embodiments of the present technology. As illustrated in FIG. 7D, the frequency diagram 740 shows power levels of frequencies on a network including an OFDM channel. Frequency markers 744, 748 mark the beginning frequency and the ending frequency of the OFDM channel. In a first section 742 of the frequency diagram 740, the frequency diagram 740 shows power levels of frequencies lower than the OFDM channel. In a second section 746 of the frequency diagram 740, the frequency diagram 740 shows power levels of frequencies of the OFDM channel. In a third section 750 of the frequency diagram 740, the frequency diagram 740 shows power levels of frequencies higher than the OFDM channel. As illustrated in FIG. 7D, there is a fault in the OFDM channel corresponding to a drop 752 in the power levels of the frequencies of the OFDM channel in the second section 746. There are no apparent faults in the first section 742 and the third section 750.

Figure 7E:
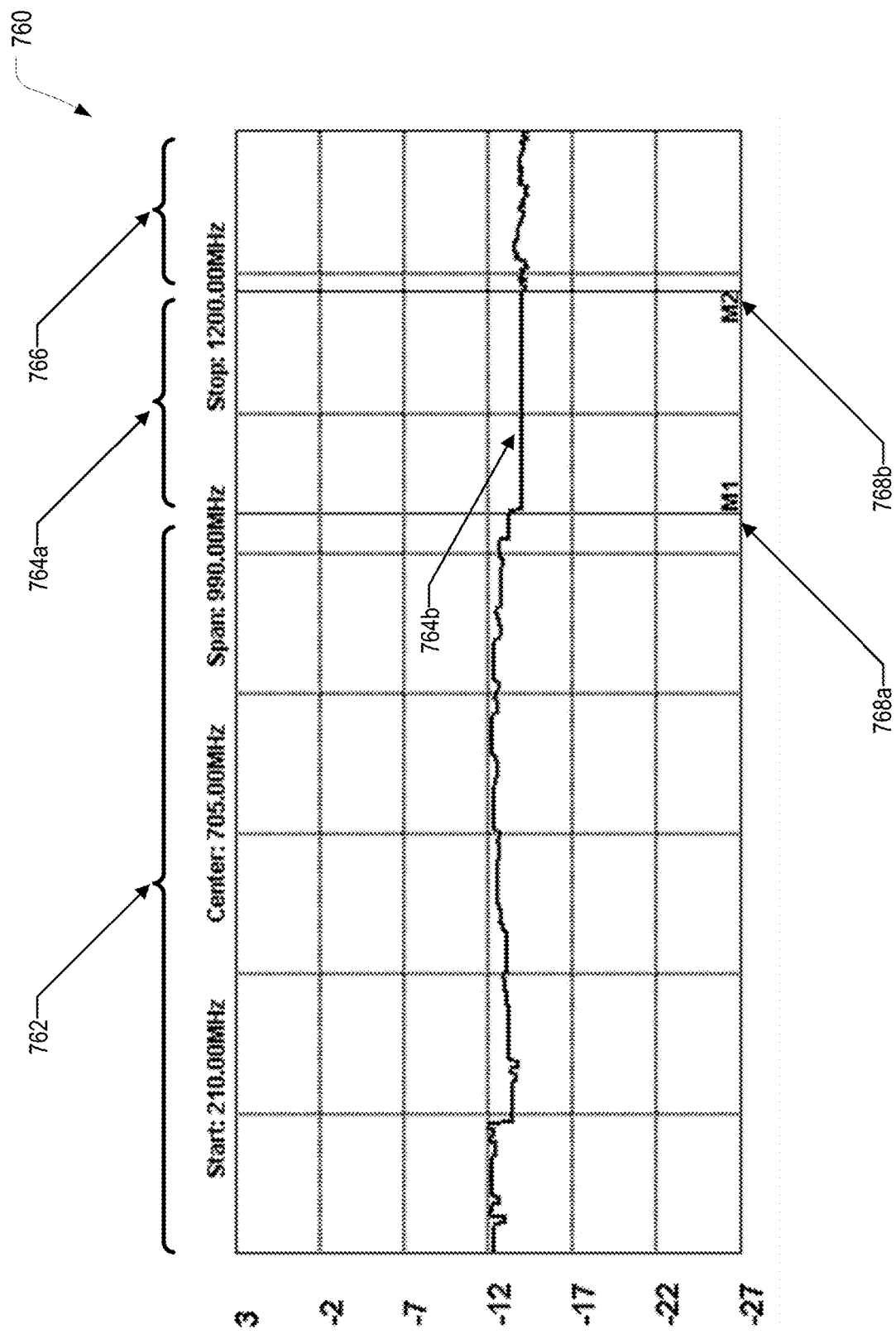

FIG. 7E illustrates an example frequency diagram 760 associated with a sweep test without OFDM sweeping, according to various embodiments of the present technology. The example frequency diagram 760 can be associated with a sweep test of the network associated with example frequency diagram 740 in FIG. 7D. As illustrated in FIG. 7E, the frequency diagram 760 shows measured power levels of various sweep tones generated during the sweep test. Frequency markers 768a, 768b mark the beginning frequency and the ending frequency of the OFDM channel. In a first section 762 of the frequency diagram 760, the frequency diagram 760 shows the measured power levels of sweep tones generated for frequencies lower than an OFDM channel. In a second section 764a of the frequency diagram 760, the frequency diagram 760 shows a flat line 764b for the frequencies of the OFDM channel. The flat line indicates a lack of measured power levels for the frequencies of the OFDM channel. Because sweep tones are not generated in the OFDM channel, a sweep test that only measures generated sweep tones does not measure the power levels associated with the OFDM channel. Accordingly, a fault in the OFDM channel, such as that illustrated in the example frequency diagram 740 in FIG. 7D, is not detected in the sweep test that only measures generated sweep tones without OFDM sweeping. In a third section 766 of the frequency diagram 760, the frequency diagram 760 shows the measured power levels of sweep tones generated for frequencies higher than the OFDM channel. As illustrated in FIG. 7E, there are no apparent faults in the first section 762 and the third section 766. Whether there are faults in the OFDM channel is unknown based on the frequency diagram 760.

Figure 7F:
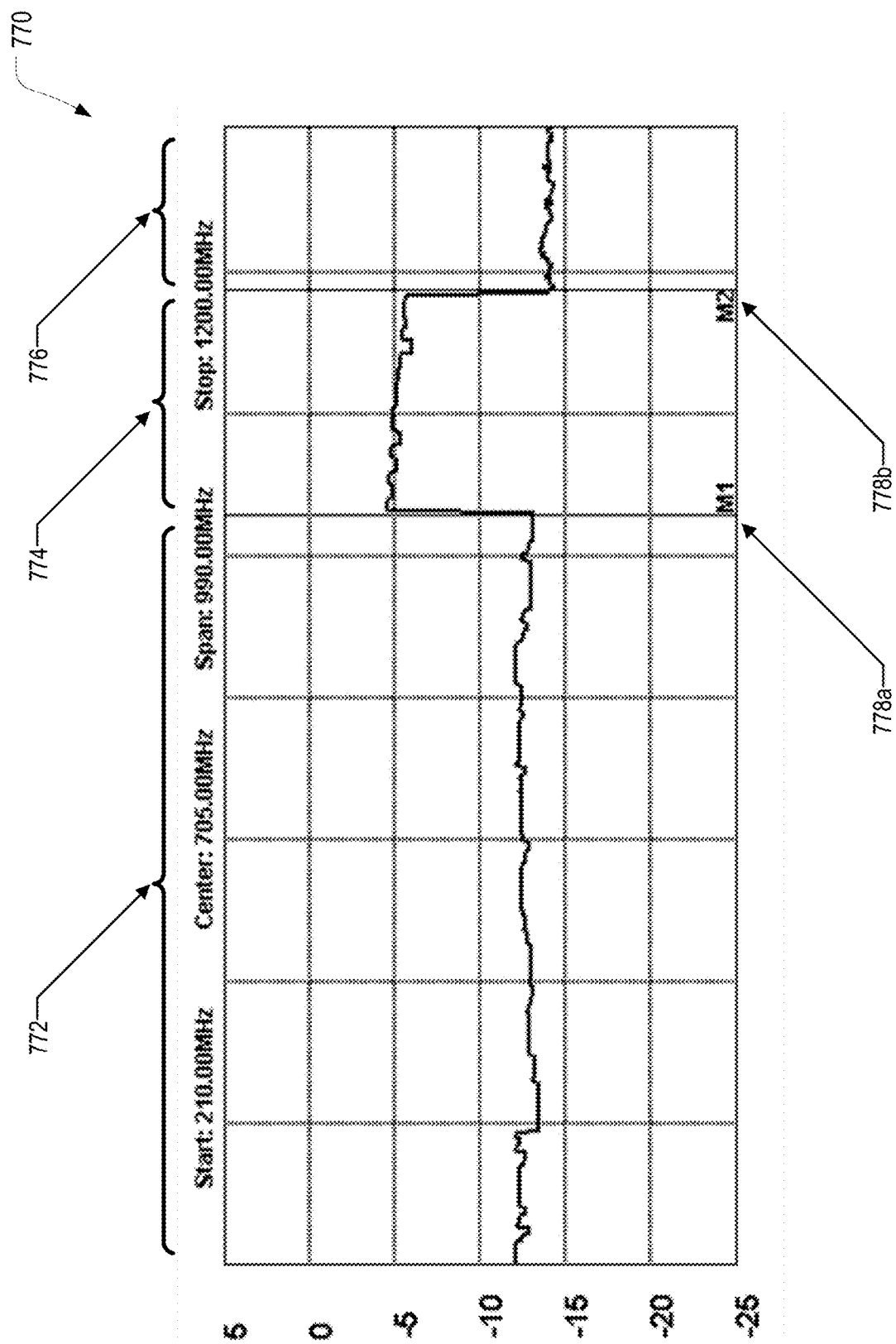

FIG. 7F illustrates an example frequency diagram 770 associated with a sweep test with OFDM sweeping, according to various embodiments of the present technology. The example frequency diagram 770 can be associated with a sweep test of the network associated with example frequency diagram 720 in FIG. 7C. As illustrated in FIG. 7F, the frequency diagram 770 shows measured power levels of various sweep tones generated during the sweep test and measured power levels of guardband frequencies in an OFDM channel. Frequency markers 778a, 778b mark the beginning frequency and the ending frequency of the OFDM channel. In a first section 772 of the frequency diagram 770, the frequency diagram 770 shows the measured power levels of sweep tones generated for frequencies lower than the OFDM channel. In a second section 774 of the frequency diagram 770, the frequency diagram 770 shows measured power levels of guardband frequencies of the OFDM channel. Because sweep tones are not generated in the OFDM channel, a sweep test with OFDM sweeping measures the guardband frequencies of the OFDM channel. In a third section 776 of the frequency diagram 770, the frequency diagram 770 shows the measured power levels of sweep tones generated for frequencies higher than the OFDM channel. As illustrated in FIG. 7F, there are no apparent faults in the first section 772, the OFDM channel associated with the second section 774, and the third section 776.

Figure 7G:
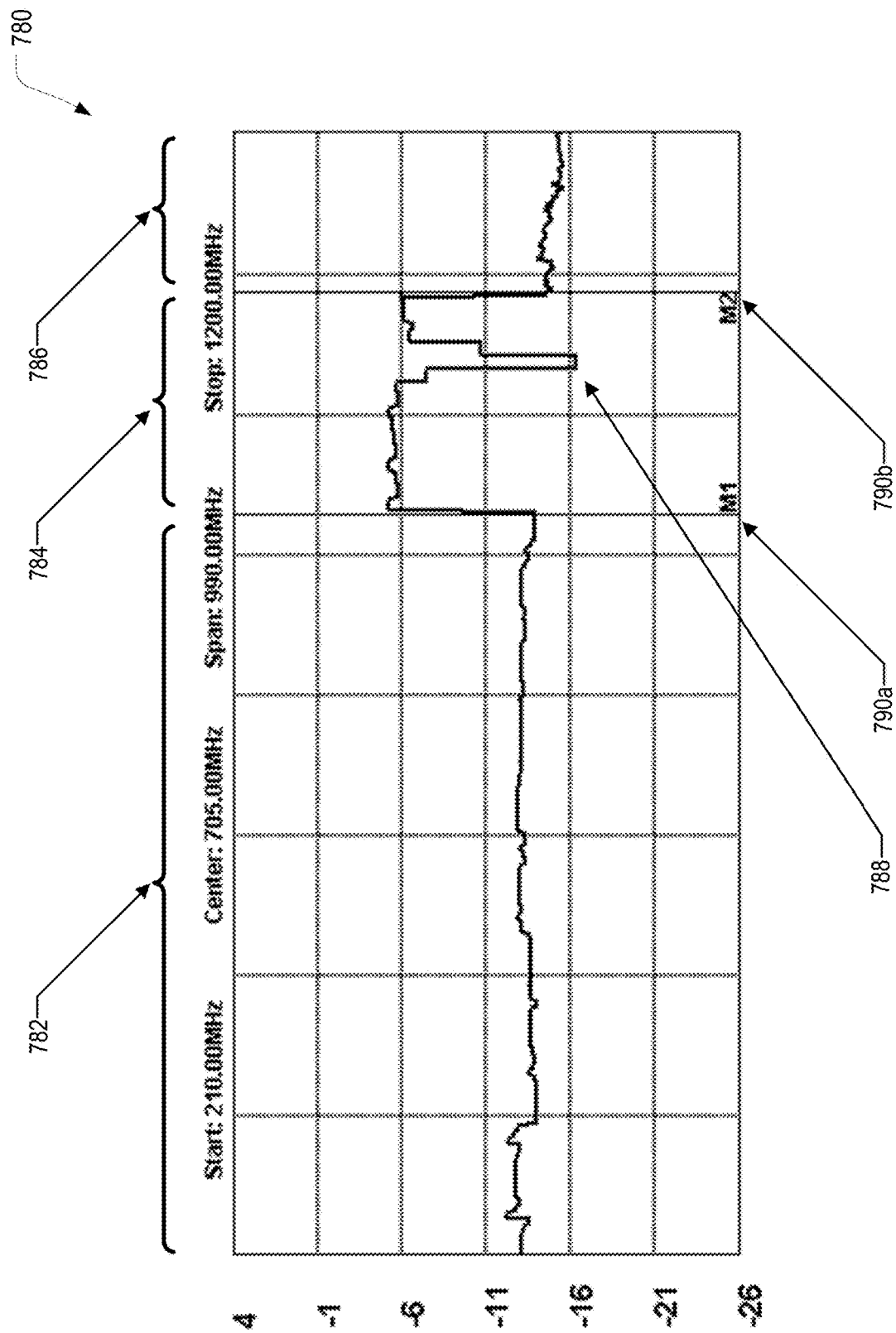

FIG. 7G illustrates an example frequency diagram 780 associated with a sweep test with OFDM sweeping, according to various embodiments of the present technology. The example frequency diagram 780 can be associated with a sweep test of the network associated with example frequency diagram 740 in FIG. 7D. As illustrated in FIG. 7G, the frequency diagram 780 shows measured power levels of various sweep tones generated during the sweep test and measured power levels of guardband frequencies in an OFDM channel. Frequency markers 790a, 790b mark the beginning frequency and the ending frequency of the OFDM channel. In a first section 782 of the frequency diagram 780, the frequency diagram 780 shows the measured power levels of sweep tones generated for frequencies lower than the OFDM channel. In a second section 784 of the frequency diagram 780, the frequency diagram 780 shows measured power levels of guardband frequencies of the OFDM channel. The measured power levels of the guardband frequencies of the OFDM channel can be evaluated against the nominal power levels of the guardband frequencies. A fault in the OFDM channel, such as that illustrated in the example frequency diagram 740 in FIG. 7D is detected here at a drop 788. In a third section 786 of the frequency diagram 780, the frequency diagram 780 shows the measured power levels of sweep tones generated for frequencies higher than the OFDM channel. As illustrated in FIG. 7G, there is a fault associated with the drop 788 in the OFDM channel associated with the second section 784. There are no apparent faults in the first section 782 and the third section 786.

Figure 8D:
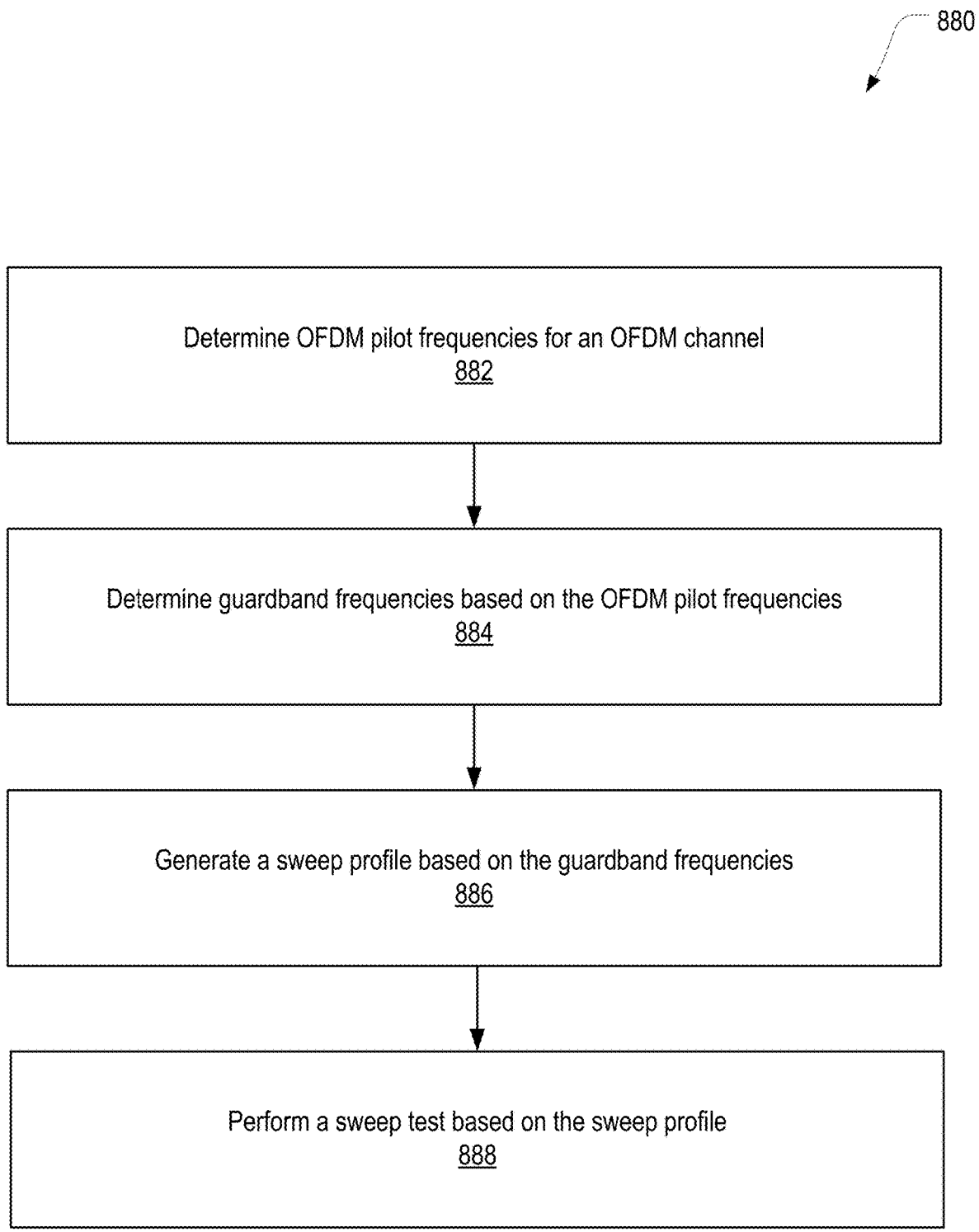

FIG. 8D illustrates an example method 880, according to various embodiments of the present technology. It should be appreciated that there can be additional, fewer, or alternative steps performed in similar or alternative orders, or in parallel, within the scope of the various embodiments discussed herein unless otherwise stated. At block 882, the example method 880 determines OFDM pilot frequencies for an OFDM channel. At block 884, the example method 880 determines guardband frequencies based on the OFDM pilot frequencies. At block 886, the example method 880 generates a sweep profile based on the guardband frequencies. At block 888, the example method 880 performs a sweep test based on the sweep profile.

It is contemplated that there can be many other uses, applications, and/or variations associated with the various embodiments of the present technology. For example, various embodiments of the present technology can learn, improve, and/or be refined over time.

In various embodiments, the functionalities described herein with respect to the present technology can be implemented, in part or in whole, as software, hardware, or any combination thereof. In some cases, the functionalities described with respect to the present technology can be implemented, in part or in whole, as software running on one or more computing devices or systems. For example, the functionalities described with respect to on demand sweep testing, automatic generation of sweep profile, and OFDM table generation and sweeping, or at least a portion thereof can be implemented as or within an application (e.g., app), a program, an applet, or an operating system, etc., running on a user computing device or a client computing system. In a further example, the functionalities described with respect to the present technology or at least a portion thereof can be implemented using one or more computing devices or systems that include one or more servers, such as network servers or cloud servers. The functionalities described with respect to the present technology or at least a portion thereof can be implemented using computer system 900 of FIG. 9. It should be understood that there can be many variations or other possibilities.

Hardware Implementation

Figure 9:
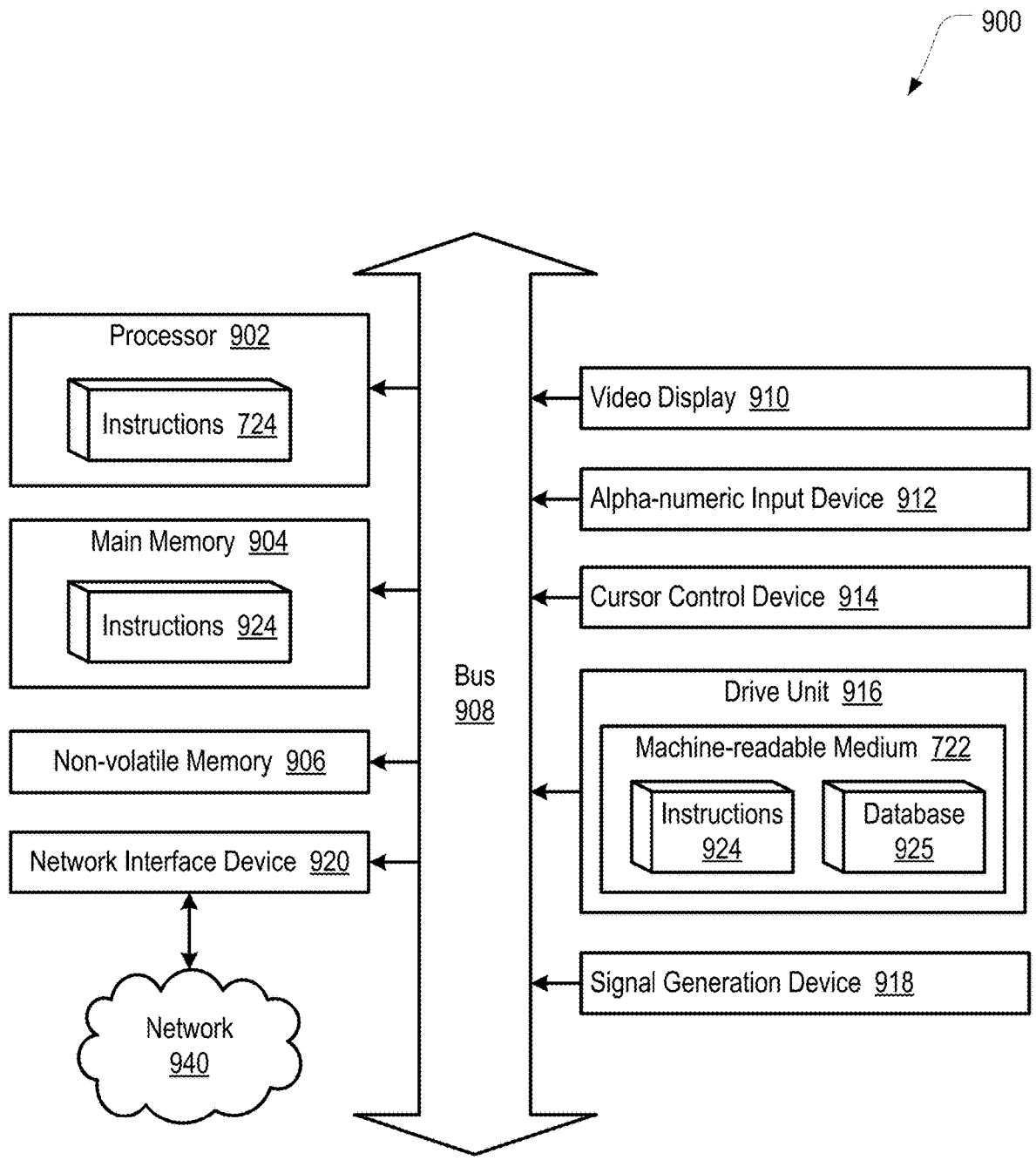
FIG. 9 illustrates an example of a computer system or computing device that can be utilized in various scenarios, according to various embodiments of the present technology.

The foregoing processes and features can be implemented by a wide variety of machine and computer system architectures and in a wide variety of network and computing environments. FIG. 9 illustrates an example of a computer system 900 that may be used to implement one or more of the embodiments described herein according to an embodiment of the invention. The computer system 900 includes sets of instructions 924 for causing the computer system 900 to perform the processes and features discussed herein. The computer system 900 may be connected (e.g., networked) to other machines and/or computer systems. In a networked deployment, the computer system 900 may operate in the capacity of a server or a client machine in a client-server network environment, or as a peer machine in a peer-to-peer (or distributed) network environment.

The computer system 900 includes a processor 902 (e.g., a central processing unit (CPU), a graphics processing unit (GPU), or both), a main memory 904, and a nonvolatile memory 906 (e.g., volatile RAM and non-volatile RAM, respectively), which communicate with each other via a bus 908. In some embodiments, the computer system 900 can be a desktop computer, a laptop computer, personal digital assistant (PDA), or mobile phone, for example. In one embodiment, the computer system 900 also includes a video display 910, an alphanumeric input device 912 (e.g., a keyboard), a cursor control device 914 (e.g., a mouse), a drive unit 916, a signal generation device 918 (e.g., a speaker) and a network interface device 920.

In one embodiment, the video display 910 includes a touch sensitive screen for user input. In one embodiment, the touch sensitive screen is used instead of a keyboard and mouse. The disk drive unit 916 includes a machine-readable medium 922 on which is stored one or more sets of instructions 924 (e.g., software) embodying any one or more of the methodologies or functions described herein. The instructions 924 can also reside, completely or at least partially, within the main memory 904 and/or within the processor 902 during execution thereof by the computer system 900. The instructions 924 can further be transmitted or received over a network 940 via the network interface device 920. In some embodiments, the machine-readable medium 922 also includes a database 925.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 906 may also be a random access memory. The non-volatile memory 906 can be a local device coupled directly to the rest of the components in the computer system 900. A non-volatile memory that is remote from the system, such as a network storage device coupled to any of the computer systems described herein through a network interface such as a modem or Ethernet interface, can also be used.

While the machine-readable medium 922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 900 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 700 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually effect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in both method and apparatus modes.

Further, each of the various elements of the invention and claims may also be achieved in a variety of manners. This technology should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A device comprising:
an integrated power source;
radio frequency (RF) components, configured to transmit forward signals through a network and receive return signals through the network; and
computing components, including a processor, configured to:
interface with a section of the network;
receive a sweep request from a field test unit on the section of the network;
generate a timing sync message in response to the sweep request; and
generate sweep tones on the section of the network.

2. The device of claim 1, further comprising:
an RF board, wherein the RF components are located on the RF board; and
a CPU board, wherein the computing components are located on the CPU board, and wherein the RF board and the CPU board are stacked within a chassis.

3. The device of claim 2, wherein the RF components are located on a side of the RF board opposite with respect to a side of the CPU board where the computing components are located.

4. The device of claim 2, wherein the RF components are located on a side of the RF board facing the chassis, and wherein the computing components are located on a side of the CPU board facing the chassis.

5. The device of claim 2, further comprising:
thermal material contacting the chassis and contacting heat generating components of the RF components and the computing components.

6. The device of claim 1, further comprising:
a first RF-connector, wherein the RF components are configured to transmit the forward signals through the first RF-connector; and
a second RF-connector, wherein the RF components are configured to receive the reverse signals through the second RF-connector.

7. The device of claim 1, further comprising:
one or more RF-connectors; and
one or more waterproof slide-on boots configured to cover the one or more RF-connectors.

8. The device of claim 1, further comprising:
a user interface panel, wherein the user interface panel includes one or more USB interfaces, one or more RJ-45 connectors, and one or more LEDs to indicate at least one of: power, active forward signal, active return signal, battery charging, and battery status.

9. The device of claim 1, further comprising:
a user interface panel; and
a weatherproof door that can cover the user interface panel.

10. The device of claim 1, further comprising:
a metal chassis, wherein the integrated power source, the RF components, and the computing components are located in the metal chassis; and
a removeable protector with one or more attachment points.

11. The device of claim 1, wherein the integrated power source includes a rechargeable 3P3S battery.

12. The device of claim 1, wherein the computing components are further configured to:
generate a sweep profile for conducting a sweep test on the section of the network, wherein the sweep tones are generated based on the sweep profile.

13. The device of claim 1, wherein the computing components are further configured to:
facilitate an Orthogonal Frequency-Division Multiplexing (OFDM) sweep test on the section of the network.

14. The device of claim 1, wherein the computing components are further configured to:
measure reverse sweep tones on the section of the network.

15. A method comprising:
interfacing, by a remote transmitter test unit, with a section of the network;
receiving, by the remote transmitter test unit, a sweep request from a field test unit on the section of the network;
generating, by the remote transmitter test unit, a timing sync message in response to the sweep request; and
generating, by the remote transmitter test unit, sweep tones on the section of the network.

16. The method of claim 15, further comprising:
generating, by the remote transmitter test unit, a sweep profile for conducting a sweep test on the section of the network, wherein the sweep tones are generated based on the sweep profile.

17. The method of claim 15, further comprising:
facilitating, by the remote transmitter test unit, an Orthogonal Frequency-Division Multiplexing (OFDM) sweep test on the section of the network.

18. A non-transitory computer-readable storage medium including instructions that, when executed by at least one processor of a remote transmitter test unit, cause the remote transmitter test unit to perform a method comprising:
interfacing with a section of the network;
receiving a sweep request from a field test unit on the section of the network;
generating a timing sync message in response to the sweep request; and
generating sweep tones on the section of the network.

19. The non-transitory computer-readable storage medium of claim 18, wherein the method further comprises:
generating a sweep profile for conducting a sweep test on the section of the network, wherein the sweep tones are generated based on the sweep profile.

20. The non-transitory computer-readable storage medium of claim 18, wherein the method further comprises:
facilitating an Orthogonal Frequency-Division Multiplexing (OFDM) sweep test on the section of the network.

* * * * *